United States Patent [19]

Pshtissky et al.

[11] Patent Number: 4,700,230

[45] Date of Patent: Oct. 13, 1987

[54] MODULAR VIDEO CONTROL SYSTEM

[75] Inventors: Yacov A. Pshtissky, Bayside; Donald N. Horn, Cold Spring Harbor; John Skidmore, Mastic Beach, all of N.Y.

[73] Assignee: Vicon Industries, Inc., Melville, N.Y.

[21] Appl. No.: 645,483

[22] Filed: Aug. 29, 1984

[51] Int. Cl.[4] .............................................. H04N 5/268
[52] U.S. Cl. ........ ............................ 358/181; 358/185; 358/86; 455/349
[58] Field of Search ............... 358/181, 185, 149, 254, 358/86; 455/348, 349, 347, 3

[56] References Cited

U.S. PATENT DOCUMENTS

| | | | |
|---|---|---|---|
| 3,894,177 | 7/1975 | Howell | 358/185 |
| 3,900,705 | 8/1975 | Richter | 358/181 |
| 4,285,063 | 8/1981 | Zbinden | 358/149 |

Primary Examiner—Tommy P. Chin
Attorney, Agent, or Firm—Darby & Darby

[57] ABSTRACT

A modular video switching system for switching a video signal from one of many video cameras to a video monitor. The system includes one or more individual modules each containing a limited set of input channels. The modules can be cascaded with each other to permit scanning of the video signals from all modules on to a single video monitor. Also provision is made for modular camera controls, requiring only a single control for all cameras, using modular circuitry to rout the control signals to the appropriate camera.

11 Claims, 19 Drawing Figures

MODULAR VIDEO CONTROL SYSTEM

BACKGROUND OF THE INVENTION

1. Field of the Invention

This invention pertains to the field of video switching systems and more particularly to a video switching system for selecting a video signal from a plurality of video channels comprised of independent modular units which may be cascaded to increase or decrease the number of video channels as desired by a user.

2. Description of the Prior Art

Prior art systems for switching video signals from a plurality of video input channels to one or more monitors used for viewing the video signal have consisted of integrated switching systems adapted to the particular number of video channels used in the video system. Such video switching systems are often used in CCTV surveillance systems, in which the video signals originate from surveillance cameras. Video switching systems, however, also find application in other fields in which a plurality of video signals are to be switched such as in television studios or editing of video signals originating from pre-recorded and live sources. Also the end destination of the switched signal can include devices other than monitors, for example, video tape recorders (VTR) or broadcast transmitters.

Up until now, video switching systems have been available having a predetermined number of video inputs, usually 4, 8, 12, etc. If the surveillance installation included 6 cameras of which it was desired to be able to scan from each camera in a selected sequence, a switcher having 8 inputs and at least one output was required. The switch would have to be altered to accept 6 inputs. If at a later date a user of the video security system desired to increase the number of surveillance cameras to, for example, ten, it was necessary to completely replace the eight channel switcher with a twelve channel switcher, at a consequent financial loss.

Individual CCTV installations have differing requirements. Most such video security systems are used in industrial and commercial environments and the number of cameras needed is dictated by the nature of the installation. Should the owner of the installation decide to alter the premises to expand or decrease the number of areas for which surveillance is needed, prior art switching systems required the complete replacement of the video switching unit to accommodate changes in the number of cameras since they lacked the flexibility to be used in a system having a number of video inputs different from that for which they were designed.

Due to this lack of flexibility, it was necessary for a manufacturer to make, and a distributor to stock, a large number of different switching units each tailored to a specific installation. Consequently, the cost of the resulting switching unit was necessarily higher, due to the additional engineering time required to design a large number of units, the added expenses for the maintenance of a larger inventory (both by the distributor and the manufacturer) and the increased manufacturing costs since production efficiencies are not as easily realized by a large number of small production runs as in a large production run of a single item. These costs were, of course, passed on to the purchaser, and raising the cost of an installation commensurately.

Additionally, since in most prior art systems the video switching device is designed for a particular installation and is one integrated unit, failure of any section of the circuitry would often necessitate shutdown of the entire system for repair. In the present invention, the modular nature of the video switcher permits the removal of a single module if it fails. Thereafter, the system may be repaired simply by the removal of the failed module which can then either immediately be replaced or taken out for repairs, while permitting at least a portion of the surveillance system to remain in service.

It is often necessary to remotely control the operation of the surveillance camera from the remote console in the monitoring area. In conventional video switchers individual camera controls are provided for each remote camera. Thus, individual iris, pan, tilt, zoom and focus controls might be included for each camera at the remote console to control these functions. This results in a very bulky system having a very large number of controls. Such systems are not only inconvenient for an operator to use, but also require a large amount of mounting space which is not always readily available in the monitoring area.

It is thus an object of the present invention to provide a video switching system that is expandable to accept any desired number of video inputs.

It is a further object to provide a video switching unit that can be assembled from a plurality of identical or nearly identical modules which can be cascaded when the user's needs change.

It is yet another object to provide a flexible, complete, video switching system which is inexpensive to manufacture and requires a minimum of space.

These and other objects of the present invention will become apparent upon reference to the following specification and annexed drawings.

SUMMARY OF THE INVENTION

The present invention is a video switching system for switching a plurality of video input signals to at least one video monitor. The video switching system includes a master module and individual slave modules cascadable to permit the use of any number of monitors and/or video input signals. Each module permits the acceptance and switching of video input signals to the video monitors. In one embodiment of the invention, video switching is under the control of a microcomputer. In other embodiments of the invention, logical gate arrays or discrete logic are used to implement these functions. Further, the video switching unit includes means for controlling individual video input sources, such as video cameras from a remote site utilizing a single control switch the signal from which is routed through the video switcher to the individual and remote cameras.

DESCRIPTION OF THE PREFERRED EMBODIMENTS

Figure 1:
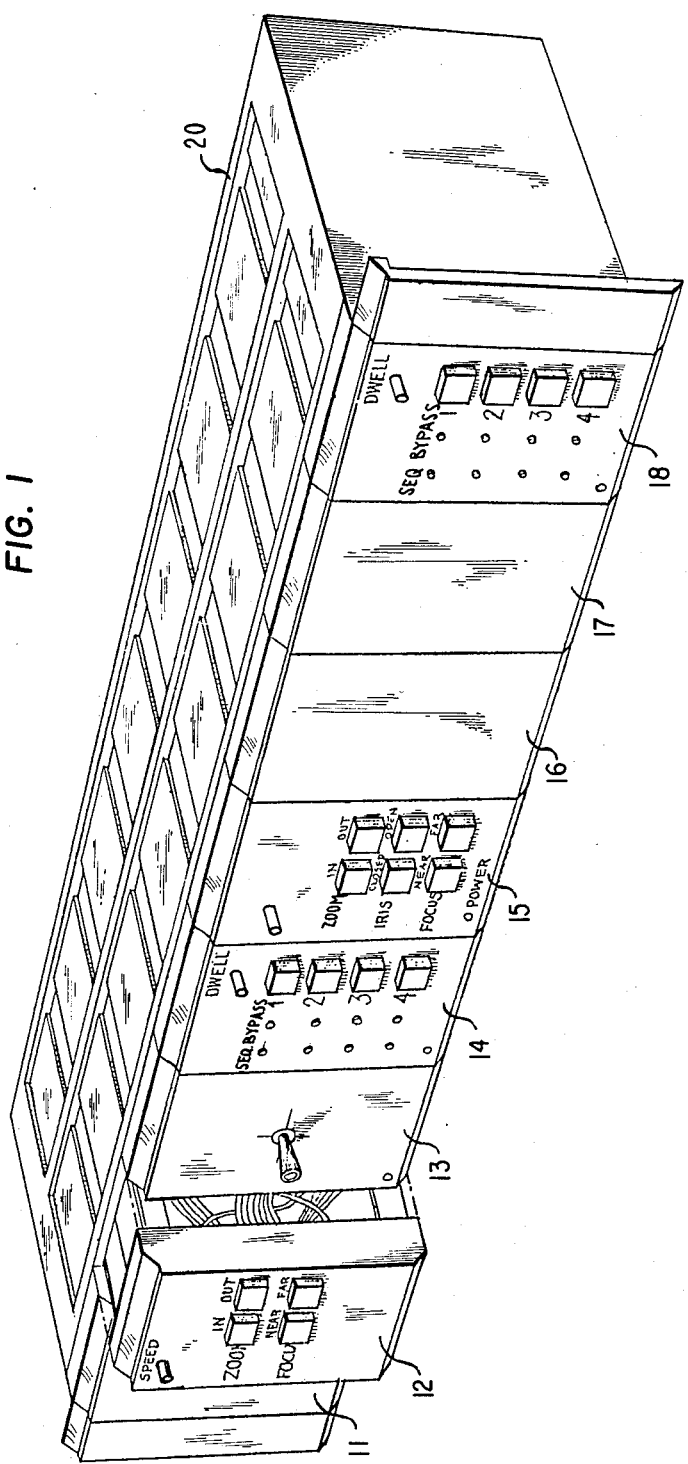
FIG. 1 is a perspective view of the invention according to the present invention.

Refer to FIG. 1, in which the video switcher 10 according to the present invention is shown. The switcher includes a plurality of individual modules 11 through 18 which are inserted in card cage 20. A chassis or card cage 20 can accommodate up to eight individual modules in a standard 19 inch by 3½ inch card cage 20 sufficiently rigid to hold the rack configuration modules, yet provide sufficient ventilation and permit quick and easy electrical interconnection. Modules 14 and 18 perform the switching function for video signals.

Each of the modules may be slid in and out of the card cage and are interconnected at the rear by connectors to a system bus, as shown by module 11, depending upon the system configuration required. Modules 16 and 17 are actually cover plates, which contain no electrical circuitry. These are included when a particular installation does not require a system large enough to use all available space in card cage 20.

In addition to performing various switching of video signals, control can also be exercised via the switching modules using lens control module 15 which provides for zoom, iris and focus controls and lens control module 11 which provides only zoom and focus controls. Also, pan and tilt controls provided by module 13 may be included to permit the panning and tilting of the camera by an operator in the remote monitoring station where the switcher is located.

Figure 2:
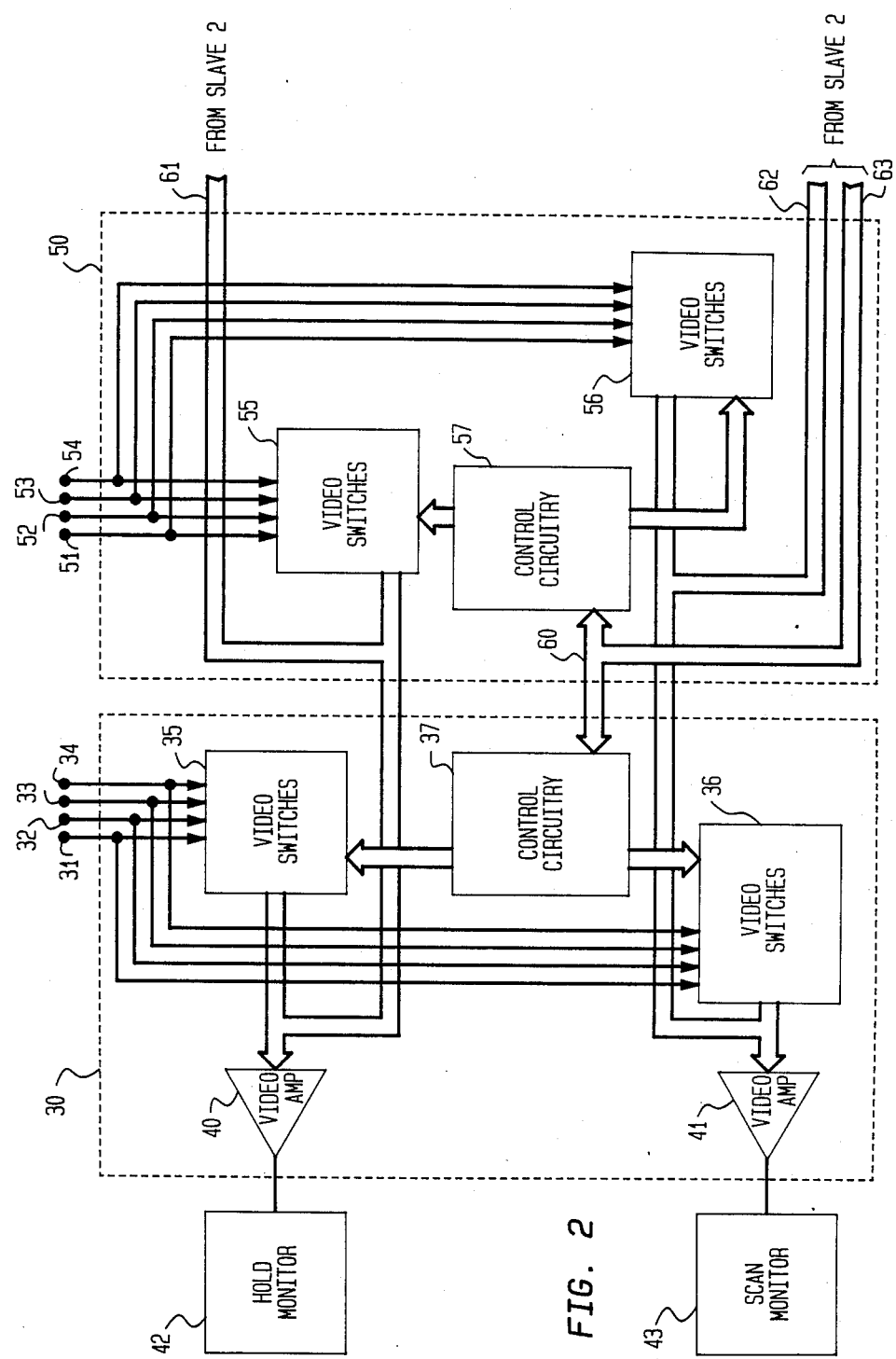
FIG. 2 is a block diagram of the circuitry according to the present invention.

Referring now to FIG. 2, a block diagram showing the interconnection of the video switching portion of the video switcher is shown. Video switcher 10 includes a single master unit 30 which can accommodate up to four video signals, and a plurality of slave units 50, which can also each accommodate four video input signals. Up to fifteen slaves can be cascaded thus allowing the switching of up to 64 channels. As will be explained further below the slaves are under the control of the master.

The master unit includes inputs 31, 32, 33 and 34 which receive video signals on four individual channels from sources such as video cameras. These video signals are fed to video switches 35 and 36, which may typically be analogue transmission gates such as the CD 4066 CMOS devices, manufactured by RCA Corporation, Sommerville, N.J., and others. The video switches 35 and 36 are under the control of control circuitry 37. The output of the video switches 35 and 36 is coupled to two video amps 40 and 41 which are in turn coupled to two video monitors 42 and 43, respectively. Each of the video monitors may be used to either show a sequential scanning of the video inputs or monitor 42 may be designated as a hold monitor to show a specific scene on a continuing basis. Video monitor 43 will scan each one of the cameras hooked up to the inputs of the video switcher in sequence. The control circuitry 37 operates to permit only one signal to appear at a given time at either video amp 40 and/or video amp 41.

Slave unit 50 includes video signal input channels 51, 52, 53 and 54 which receive signals from an additional four video sources such as, for example, video cameras or VTR's. These signals are coupled in parallel to video switches 55 and 56 and are switched by control circuitry 57. The output of the video switches 55 and 56 are also coupled to video amps 40 and 41, respectively.

Control circuits 37 and 57 communicate with one another over bus 60. Control circuit 37 is the master control circuit and sends signals to control circuit 57 to affect the orderly sequential switching of each video input in predetermined order as well as select home and alarm channels. The order is from lowest to highest within a given module (master or slave), and then from module to module in order of their addresses. Generally, the master is assigned an address of 0 and the slaves an address of 1 to 15. These addresses are set by DIP switches located in each module. Note, however, that any, and all, video input channels may be bypassed in the sequential mode.

Thus, the combination of the two units, i.e., master 30 and slave 50, permits video input channels 31 through 34 and 51 through 54 will be switched sequentially in the following order: 31, 32, 33, 34, 51, 52, 53, 54. Additional video signals can be accommodated from additional slave units, these signals appearing on buses 61, 62 and 63. Buses 61 and 62 receive additional video signals from video switches contained in a second slave unit (not shown) and control signals appearing on bus 63 and coupling into bus 60 and control circuits 37.

This architecture permits virtually an unlimited number of slave units to be attached to the video switching device shown in FIG. 1. The prime limitations is the space in a given rack, power supply requirements and the ability of the system to address only a limited number of slaves. In a preferred embodiment of the invention, the units are limited to one master and fifteen slaves to provide a total of sixty-four video inputs. This is generally adequate for most surveillance installations.

Upon power up, the video switcher will scan through the video inputs 31, 32, 33, 51, 52, 53 and 54 and display them sequentially on both monitor 42 and 43. If the operator desires to view a particular area on a continuing basis, he depresses a momentary contact switch on the front panel of a module 14 or 18 a single time. This causes an associated LED on the panel to flash and that video input channel signal to appear on monitor 42. Should the operator decide that he does not wish to view the particular area he will depress the button a second time, causing a sequential scanning to resume on both monitors skipping the position. A bypass LED is lit to indicate the bypassing of the position.

Figure 3:
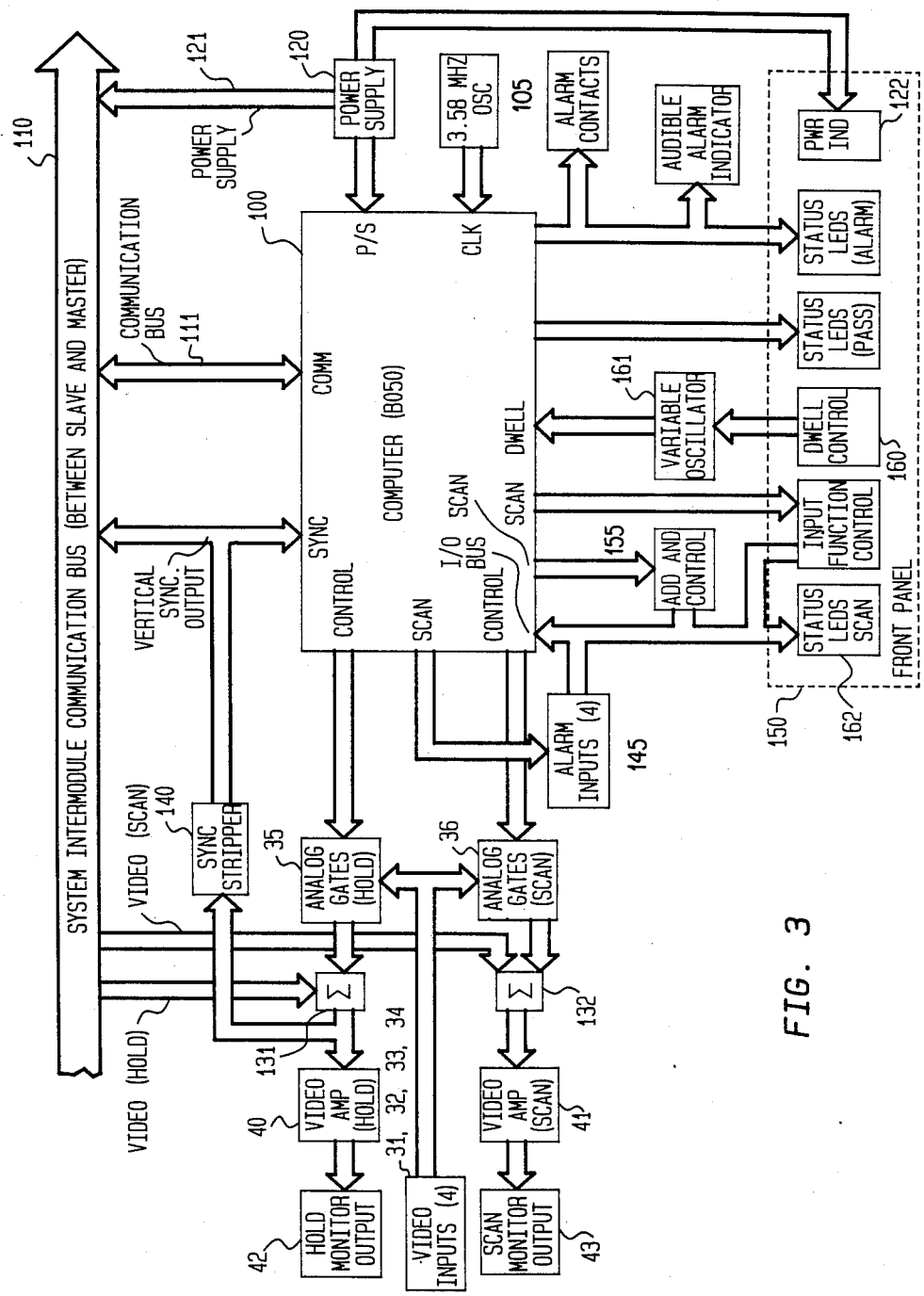
FIG. 3 is a block diagram of a microcomputer driven embodiment of a master unit.

As shown in FIG. 3, the video switches 35 and 36 are controlled by a microcomputer 100. The video switches are analog gates, also known as transmission gates, which are three terminal devices having input terminals, output terminals and control terminals. The appearance of a logical one on the control terminal will turn on an individual analog gate and allow the signal appearing at the input terminal to pass on through to the output terminal. The signals appearing from the microcomputer 100 on the control lines can switch these gates in any particular sequence determined by the microcomputer or hold a particular gate high, while keeping the rest of the gates off as desired.

Microcomputer 100 may be, for example, an 8050 microcomputer integrated circuit, manufactured by the Intel Corporation, which includes on chip read only memory (ROM) and random access memory (RAM). Microcomputer 100 includes a limited instruction set, accumulator and other registers as well, into which data is transferred and operated on.

Bus 110 is the system intermodule communication bus which carries the video signals and digital signals between the slave and master and power to the slaves.

Digital control signals from and to microcomputer 100 are carried on communication bus 111 which corresponds in part to the control bus 60 shown in FIG. 2.

Each master unit also includes power supply 120 which power supply supplies power to individual slave units which do not have their own power source. Power supply 120 is also coupled to bus 110 via power bus 121. Additionally, power bus 121 is coupled to power indicator 122, ordinarily an LED, showing that the system has been turned on.

Sync stripper interval timer (SSIT) 140 permits transition between video signals without causing tearing or distortion of the video signal being viewed on the scan monitor. As is well known in the art, in most television systems, the video signal is comprised of a plurality of fields. In the NTSC system, each field is comprised of a raster of 262 and ½ lines which are interlaced with a subsequent field of 262 and ½ lines to provide a single frame of 525 lines. Horizontal scanning is begun at the upper left-hand corner of the monitor screen. Sixty fields per second are supplied in the system resulting in a total of thirty frames per second.

In order to provide for the orderly sequential scanning of the signals, it is necessary to provide both vertical and horizontal sync signals. The horizontal sync signal will occur at the beginning of each scan line in the raster in synchronism with the horizontal sync signal generated by the video source, for example, the video camera or VTR. At the end of the predetermined number of lines a vertical sync signal is generated by the video source indicating that the field has been completed and scanning should return to the upper left-hand corner of the screen.

Since the system is designed to interface with a plurality of video sources, which video sources may not necessarily be in synchronism with one another (although they usually are in synchronism with a signal derived from the 60 Hertz powerline frequency) and also since it is likely that switching between individual video sources will occur during the middle of a field rather than at its end, switching between video signals ordinarily results in the combination of two scenes into the monitor, at least at the very beginning of the switching period. This causes a tearing of the picture on the screen. In order to avoid this, the vertical sync signal is stripped off of the incoming video signal which is received as a digital input signal by the microcomputer 100 to control the sequential switching so that the frame from the individual cameras being presently viewed is allowed to be completed and the frame from the next camera to be viewed is begun at the beginning of the scan and not at an intermediate portion of the field.

Both vertical and horizontal sync signals appear along with the video signals but are pulses having a value less than zero volts. The vertical sync signals has a frequency of 60 hz while the horizontal sync is of frequency of 15,750 hz. The vertical sync signal can thus be obtained by clamping on all signals below zero volts, for example, using a precision half wave rectifier, and using a low pass filter to pass the 60 hz signal. The result is then conditioned to be a relatively clean pulse having a transition between logical 0 and 1 for the digital logic of the system (for example between 0 and 5 volts).

Dwell control 160 is used to establish the time an individual video input appears on the screen in the sequential scan mode. A potentiometer is accessible on the front panel which controls the frequency of a variable oscillator 161. As described below a software counter in microcomputer 100 counts individual pulses from oscillator 161 until a predetermined value is obtained. This determines the dwell period. An integral jumper on the oscillator 161 permits the user to select dwell times in the range of 1.5 to 60 seconds, or 300 milliseconds to 12 seconds. The use of the software counter permits smaller capacitors to be used than a more standard timer such as the industry standard 555 integrated circuit timer permits.

Address and control circuit 155 is used to establish the address of a particular module. It generally comprises a DIP switch which is set to a particular address (in the master this is ordinarily 0).

Since the microcomputer has a limited number of ports, it is necessary to multiplex data to accommodate all the data corresponding to alarms and scan status (as shown by LEDS 162). The control portion of the circuitry may consist of tri-state buffers which turn on the appropriate data channel under control of microcomputer 100, depending upon which data the microcomputer requires.

The microcomputer system receives its timing signals from system clock 105, which may be set to 3.58 Mhz, and uses a crystal oscillator set to this frequency.

In the present invention, facilities are also provided to utilize alarms in conjunction with the video cameras. In surveillance systems, entry alarms may be used in a given area being surveyed by a camera. Thus, a door to the area being viewed may contain a magnet and reed switch which when opened will cause an alarm to go off. These alarms may be routed through the master unit at alarm inputs 145 to cause the master unit to immediately present the scene, on hold monitor 42, corresponding to the camera at which the alarm originates. Provision is also made for additional alarms to which priority is assigned in the order in which the alarms are generated. Thus, where the alarms occur from video inputs 31, 33, 32 and 34 in that order, the system first switches to present the video input channel 31 on the hold monitor 42 and also remembers the order in which the other alarms appeared. LED's on the front panel will flash, corresponding to an alarm at that camera site. After the operator has viewed the initial region of alarm (i.e. on input 31), he may then depress a switch on the front panel which will cause the video channel on the monitor to be switched to that corresponding to the depressed switch. This process may be continued by the operator until all the alarms have been viewed, at which time the system will default back into the sequential mode.

Figure 4:
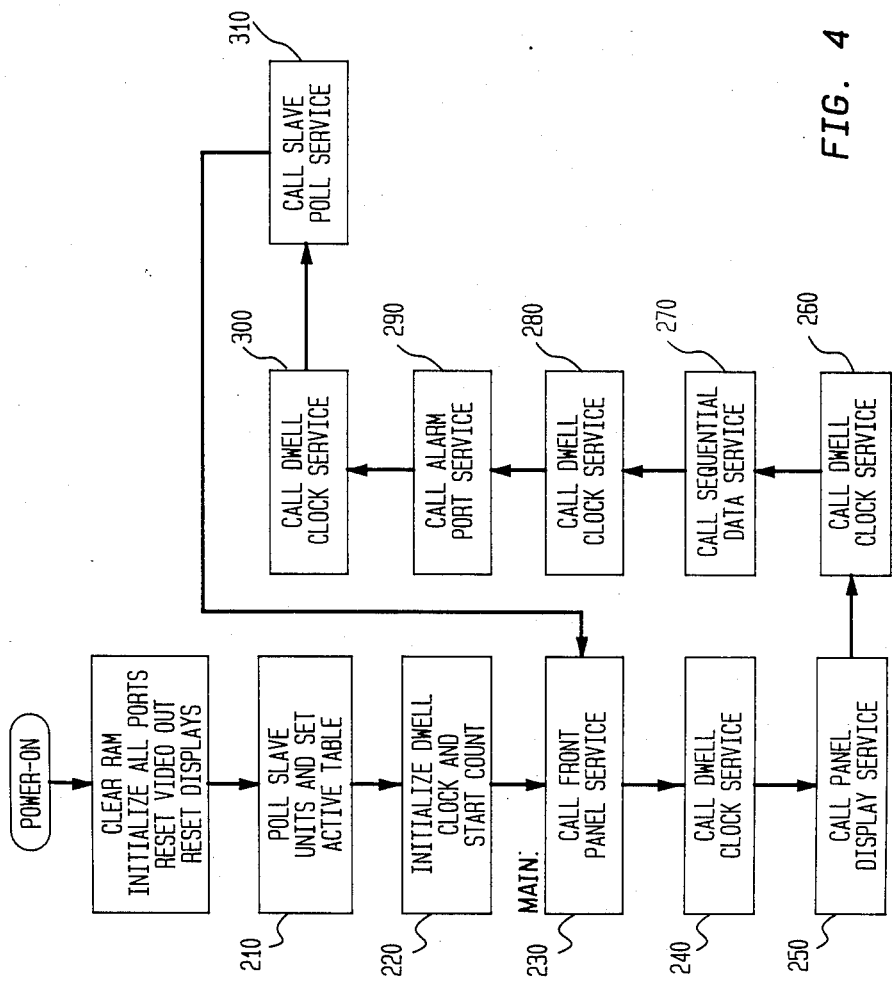
FIGS. 4 through 11 are flow charts explaining the operation of the master unit.

FIGS. 4 through 11 are flow charts illustrating the programming of microcomputer 100 in master 30. FIG. 4 shows the main loop and power up routine. The main loop routine consists essentially of a routine calling up a number of subroutines.

Referring to FIG. 4, upon power up, all RAM buffers are cleared, all ports are initialized, the video outputs are reset to the first input, and all status displays are reset. The status displays are shown collectively as display 150 and comprises a plurality of status LEDs which will be discussed further. At first step 210, the master unit polls the slave units and sets up an active table which contains a list or table of those units which have responded to the poll and are therefor in the system. Thus, after initialization, the master unit will avoid trying to talk to slaves which are not on line, permitting system expansion without any hard wiring changes.

Figure 5:
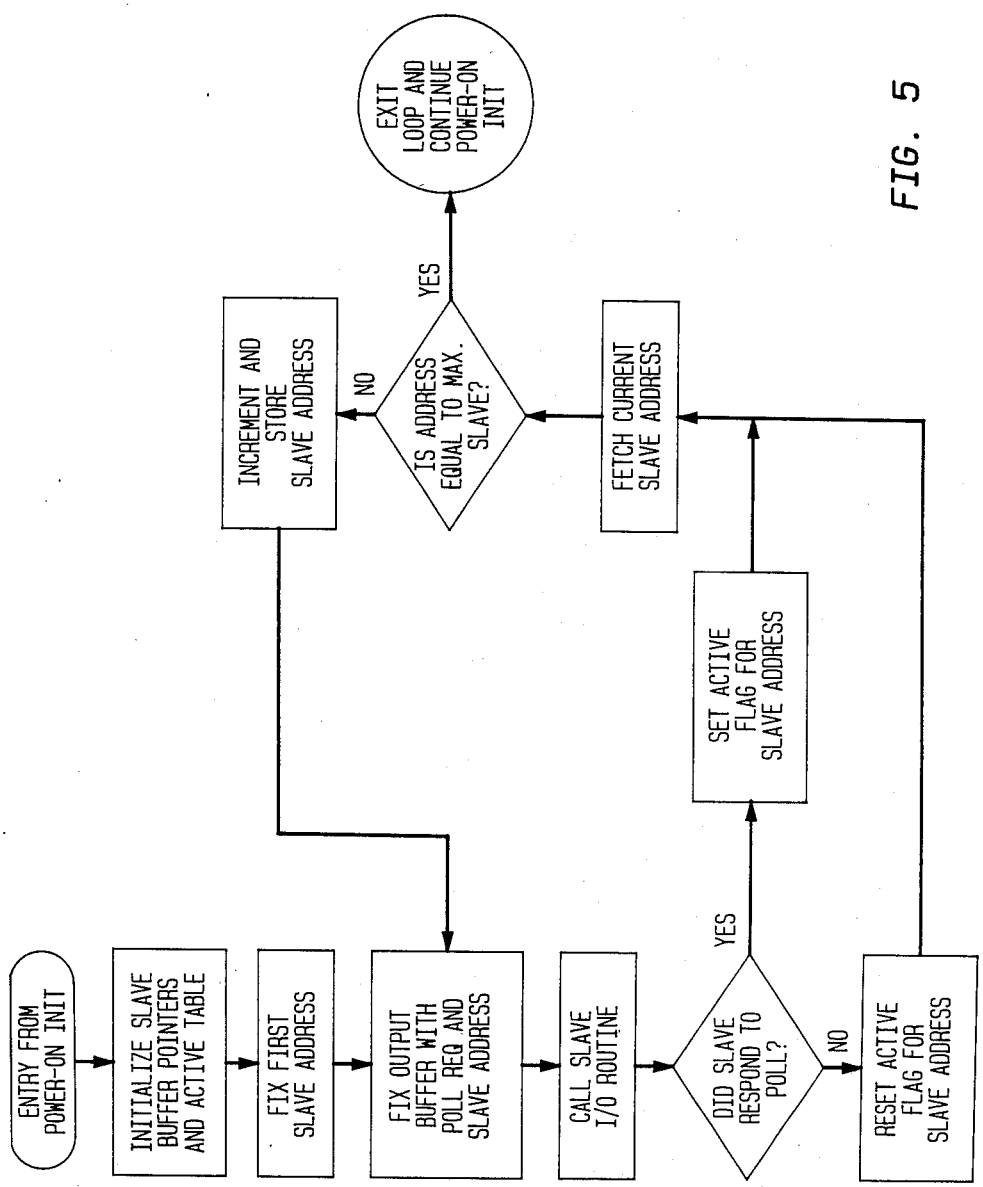

The poll slave routine 210 is further described in FIG. 5. In the first step the routine initializes the slave buffer pointers in the active table by pointing to locations in RAM to hold the slave status data. In the next step the first slave address is determined and the output buffer containing the address of the first slave is stored to enable transfer of data to the slave. The slave input-/output routine is then called up which will be discussed further hereinbelow. The routine then determines if the slave responded to the poll. If the slave did not respond to the poll, it will reset the active flag associated with the slave address (to indicate that this slave is not active) and go on to load this slave address into the accumulator. It then checks to see if this address is equal to the maximum slave address since the unit accepts no more than 15 slaves corresponding to 64 video sources. If this address is not equal to the maximum slave address, the slave address is incremented by one and the process is repeated by loading the new address into the output buffer and polling the slave having the new address. If the slave, however, responds to the poll as being present, a flag within the microprocessor is set corresponding to the slave address. The routine checks again to determine if this is the maximum slave address. If it is, the loop is exited and the initialization routine continues at step 220.

Step 220 initializes the dwell software counter to zero, and then starts it counting. Then the front panel service subroutine 230 is called up.

The switches that determine the status of what the operator wishes to view are momentary contact push buttons. In its simplest embodiment, the front panel button service subroutine is operated often enough to continually scan the position of the momentary push buttons checking whether or not they are depressed at the time of the execution of this subroutine. Such operation eliminates the need to store the condition of the push button in a latch or buffer. The scan rate resulting from the recurrence of the front panel buttons subroutine occurs so frequently that it will detect even button depressions of a short duration.

In the initial step of the subroutine, the front panel data pointers are set to specific locations in RAM in which information corresponding to the status of the front panel buttons has and will be stored. As a second step, the front panel data is read and the sub routine questions whether or not the data has changed from the last reading. It does this by comparing what the current status of the front panel buttons are to the data stored in the specific locations already determined by the pointers. If the data has not changed, in other words if the buttons are still depressed or not depressed, then it simply returns to the main loop and re-enters.

If, however, the data has changed, the new data is now stored into the location set by the front panel data pointers and it is next queried whether or not this new data is null. A null or zero data is returned if a button is not depressed at this time. If the new data is null it indicates that the operator wishes to make no changes, and the buttons have been left in the undepressed position. Once again subroutine 250 returns control to the main routine.

If the data, however, is not null, it indicates that the operator wishes to change the operation of the system to either home, or bypass a new input channel. Then the next step is to decode input button pointers. This determines which buttons have been depressed and sets up new locations in RAM corresponding to these depressed buttons to set up a new set of RAM buffers.

The button history which has been previously stored in the set of locations initially set up by the front panel data pointers is then recalled. The program then questions whether or not this is the first input from the button. As was described above, on power up both monitors are automatically set into the scan mode. In order to establish monitor 42 in the home mode, it is necessary to push the button corresponding to a given video input to cause the microcomputer 100 to seize control of that monitor and couple the video signal corresponding to that video input to monitor 42. Also, as described previously, if the button is pushed twice, it indicates that that video input should be bypassed. Thus, the program will ask if this is the first input from that particular button. If it is, it stores data corresponding to the home condition for that particular video input by setting a flag indicative of this and then stores or sets the button history in the previously established input button pointers. The system alarm flags are then loaded which have been previously set according to the alarm port service subroutine described below in relationship to FIG. 10.

As was previously described, external alarms may be triggered corresponding to a given video input channel (video camera). At this step of the sub routine, the alarm ports are checked and it is determined whether or not there is an alarm. If there is not, the subroutine seizes the home channel as previously specified and causes the video signal corresponding to the input channel button depressed by the operator to appear on the home monitor by turning on the appropriate gate 35. This information is then stored to be used to drive an LED output buffer to turn the appropriate LED. The LED will flash under control of the LED display service subroutine. Control is then returned to the main program.

If, however, any of the positions are in the alarm mode, the subroutine checks to see if the position button which has been depressed to be homed is the position that is in the alarm condition. If it is not, it will reset the home command according to the depression of the button and return control to the main loop. If this is the position in the alarm mode, it will seize the home channel output video to place that channel on the screen and once again cause the appropriate LED to be lit.

Upon return to the main loop, the dwell clock service subroutine is called up. Whenever the dwell clock subroutine is called up, it checks to see if the software counter previously described in association with oscillator 161 has reached its maximum count. If it has, it generates a dwell command to ultimately cause the next video input to be turned on in the sequential mode. Generally, the master unit transmits information in two byte groups. The information is transmitted serially at a baud rate of approximately 2400 baud. The bytes include the slave address to which the data is being sent, and commands (e.g. dwell, home, dwell time release commands). The dwell time release command however is simply dumped onto the line without regard to a slave address.

Figure 6:
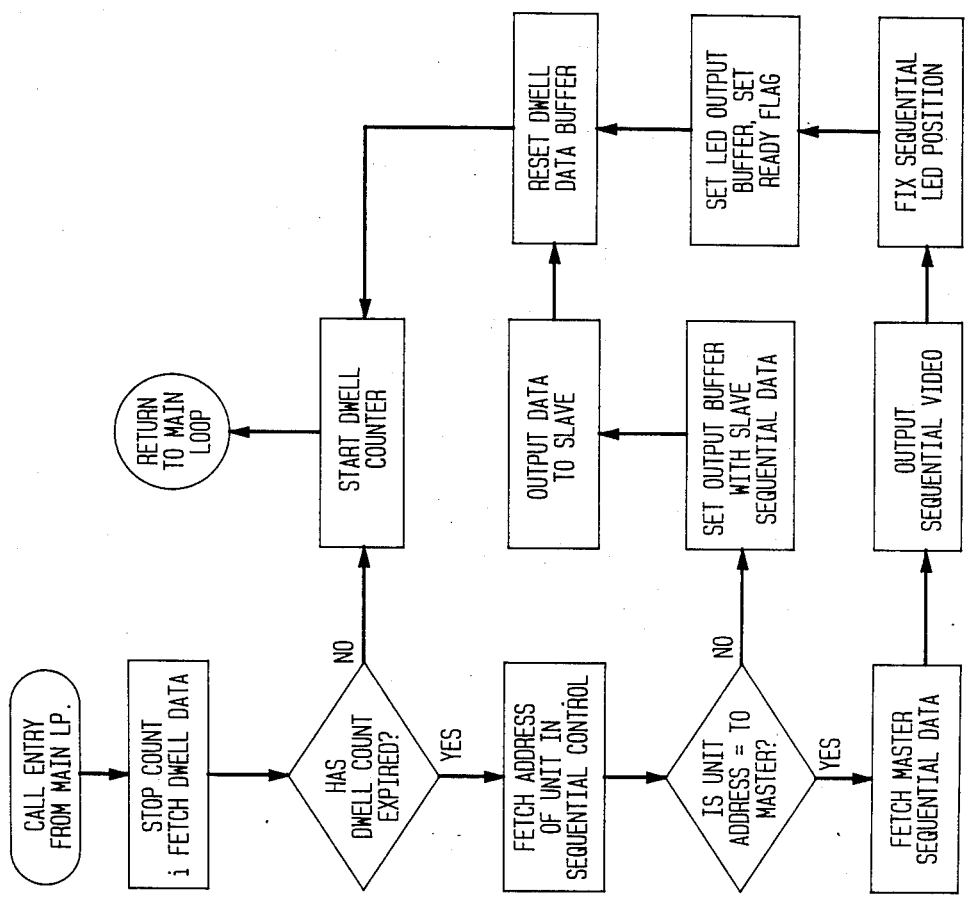
Figure 7:
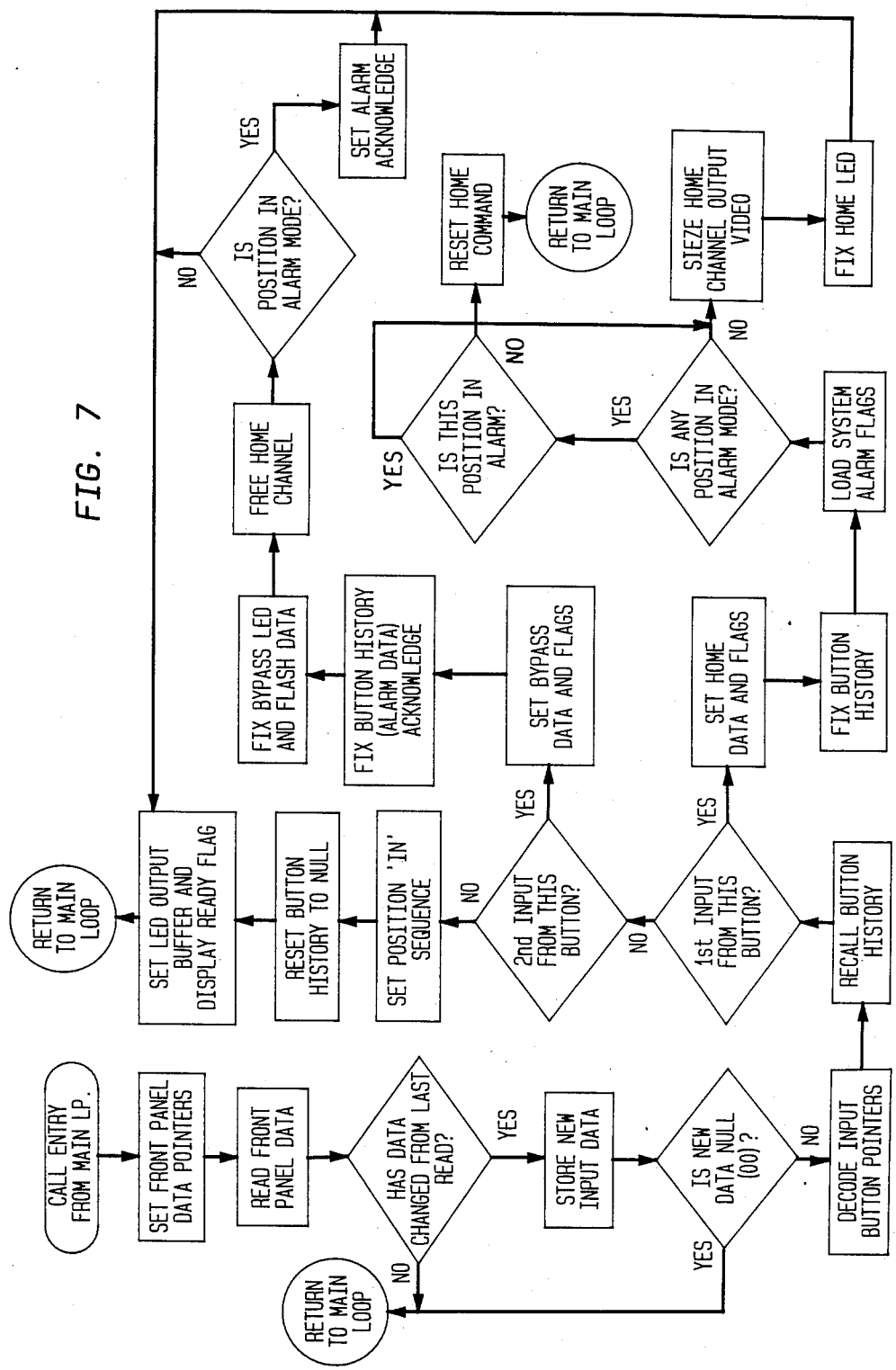
Figure 8:
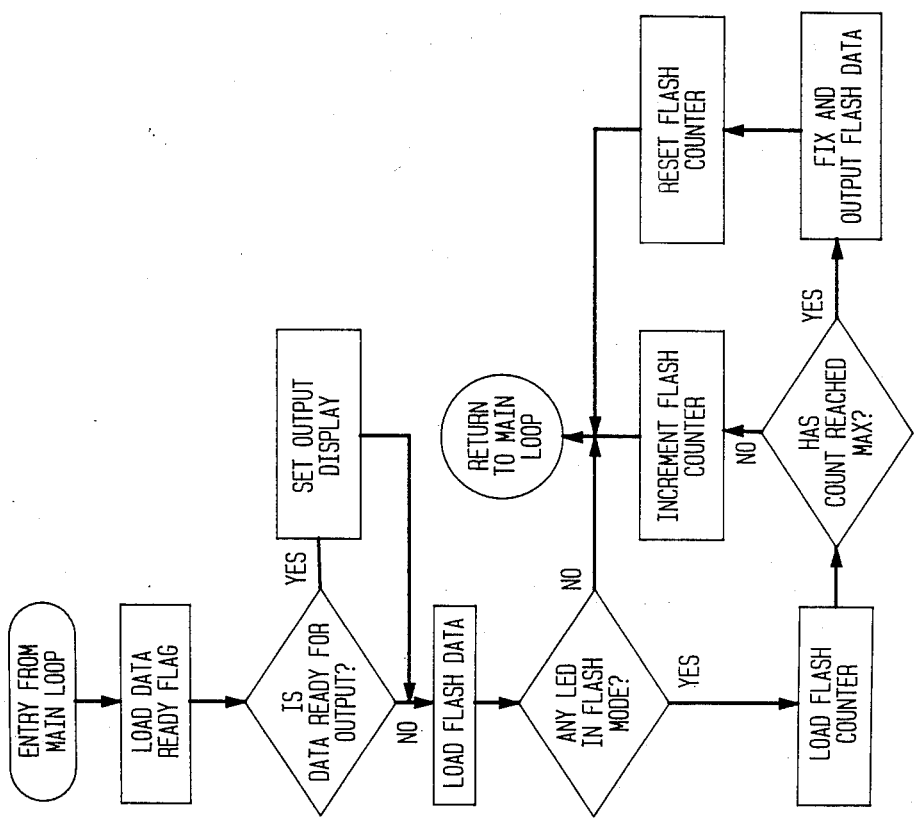
Figure 9:
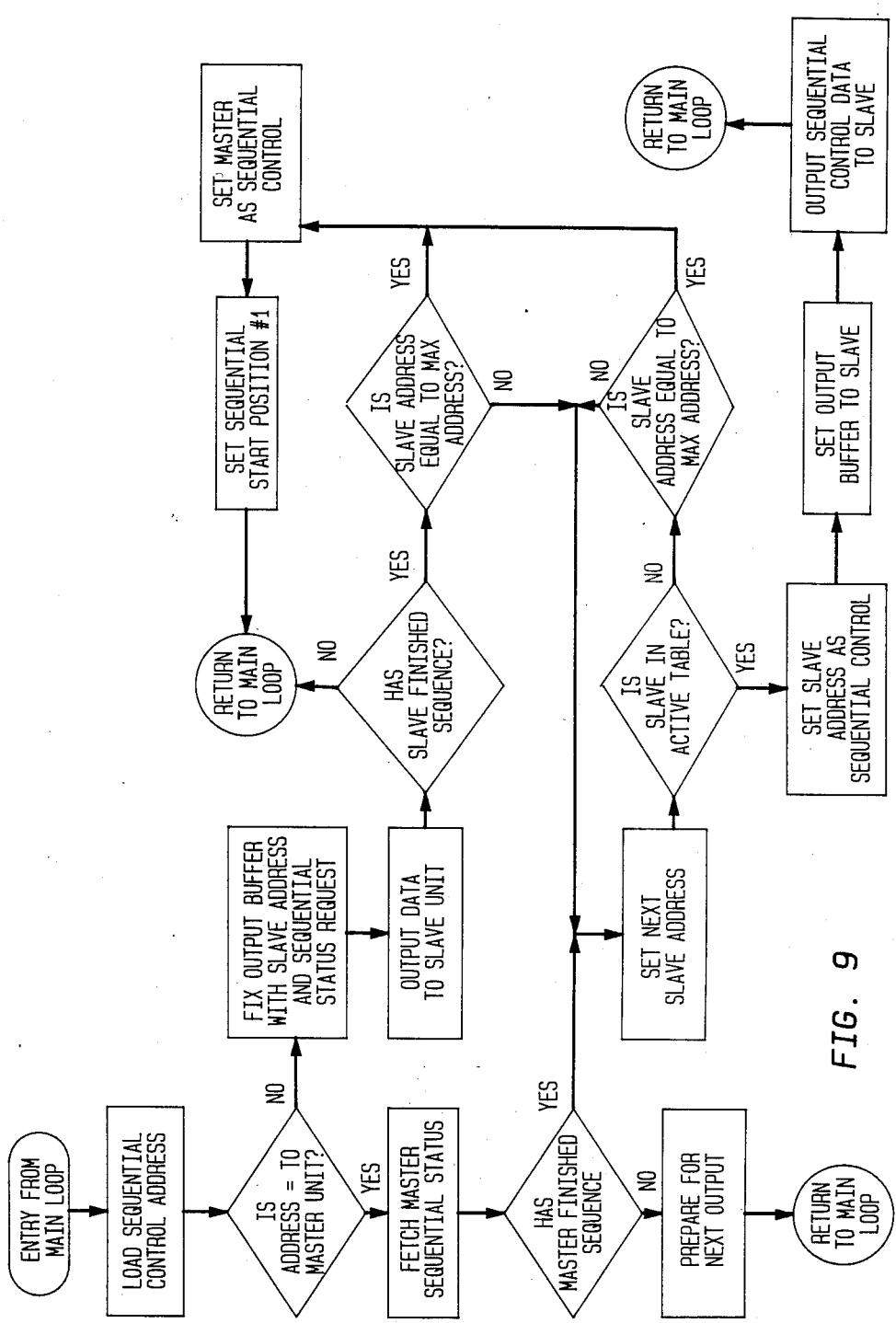

Referring to FIG. 6, the dwell clock subroutine is entered from the main loop and first operates to stop the count of the counter and load the value of the count into the accumulator. It next determines whether or not the dwell count has reached the maximum counts. If it has not, the dwell counter is restarted at the count it was .stopped at and the control is returned to the main loop.

If the dwell count has expired, the subroutine 240 obtains the address of the unit currently having control of the scan monitor. If this unit is the master (i.e. has the same address), it will fetch the sequential data from the master. It will then output the sequential video data which turns on the appropriate gate 36 as well as the appropriate LED 162 to indicate that the particular video channel is being viewed by setting the LED output buffer. Also, the ready flag is set in RAM to indicate that the LED should be lit. This flag will be used by LED display routine 250. The dwell data buffer and the dwell counter are then reset to zero and control is returned to the main loop.

If the unit on turns out not to be within the master, the output buffer is set with the slave sequential data. This data is output to the slave, and then once again control is returned to the main program and the dwell data buffer is reset.

At the completion of the dwell clock subroutine the front panel display service subroutine 250 is called next. The front panel display service subroutine is responsible for lighting the appropriate LEDs on the front panel display to indicate the status of the input channels. In this subroutine, after entry from the main loop, the data ready flag is loaded from the buffer into the accumulator. As was previously described this flag was set in the front panel button service routine. It is then determined whether the flag is set active. If it is, it will then set the output display or in other words store the output display data in a buffer. Data is then loaded corresponding to which LED should be flashing which in turn corresponds to the particular video channel that is in the home mode or alarm mode. This is determined from the alarm port service routine 290 or front panel button service routine. This data is then examined to determine if any LED should be in the flashing mode. If not, control is returned to the main loop. If it is, the flash counter is started. The flash counter is a software counter that counts up to a predetermined maximun count and then checks to see whether or not the count has reached the maximum count. Rate of count is determined by the speed of loop execution. If the maximum has not been reached, the flash counter is incremented by one and control returns to the main loop. If the maximum count has been reached, it will set an output to drive the LED and then reset the flash data before returning to the main loop. In this manner, the appropriate LED may be made to flash. The dwell clock service sub-routine at 260 is next called. Thereafter, the main loop calls up the sequential data service subroutine 270 further described with respect to FIG. 9.

Upon entry from the main loop, the sequential control address is loaded into the accumulator from RAM. Upon start up, this is always reset to the first channel. After the subroutine has run through, new sequential addresses will be generated and used at this step. Also this address can be generated by the slaves. This address is tested to see if it is equal to an address occurring in the master unit. If it is, it will fetch the master sequence status to determine how in the scanning sequence the channels have been set. In other words, determine which channel currently has control of the monitor. Next, a check is made to determine if the master has finished its sequence. If the master has not finished its sequence, it will then be prepared to scan its next controlled input channel on monitor 43. The preparation step includes noting what position the sequence is currently in and incrementing it by one. This step also checks if the next position is in the bypass mode. If it is, it increments the sequence by another one. That is, the video signal occurring from the next video channel to be scanned is sent to monitor 43. Program control is then returned to the main loop.

If the master has finished the sequence, the program sets the next slave address and checks to see if that slave is in the active table as determined in the subroutine 210 previously. If the slave address is in the active table, it is set in the sequential control and then loaded into the output buffer to the slave which alerts the slave. The output sequential control data is then sent to the slave control and returned to the main loop.

If the slave is not in the active table, the subroutine asks if the slave address is equal to the maximum address. If it is not, it will return and set the next slave address and continue in this manner until it is, at which point, the master is set as the sequential control, the sequential start position is reset to 1 and control returned to the main loop.

If, however, the address is not equal to that of the master unit, the output buffer is fixed with the slave address and sequential status request to determine the status of that slave address. Data is then output to the slave unit, which slave is queried to determine whether or not the slave has finished its sequence. If it has not, control is returned to the main loop. If it has, it is asked if the slave address is equal to the maximum address. If so, the master is once again returned to for control of the sequence and the sequence start position is set to number 1. Once again, control returns to the main loop. If the slave address is not equal to the maximum address, the next slave address is set and it is determined whether or not the slave is in the active table, and the program continues with this portion of the program as previously described.

Upon completion of the sequential data service subroutine 270 the main loop again calls up the dwell clock service routine at 280, and then the alarm port service subroutine 290.

Figure 10:
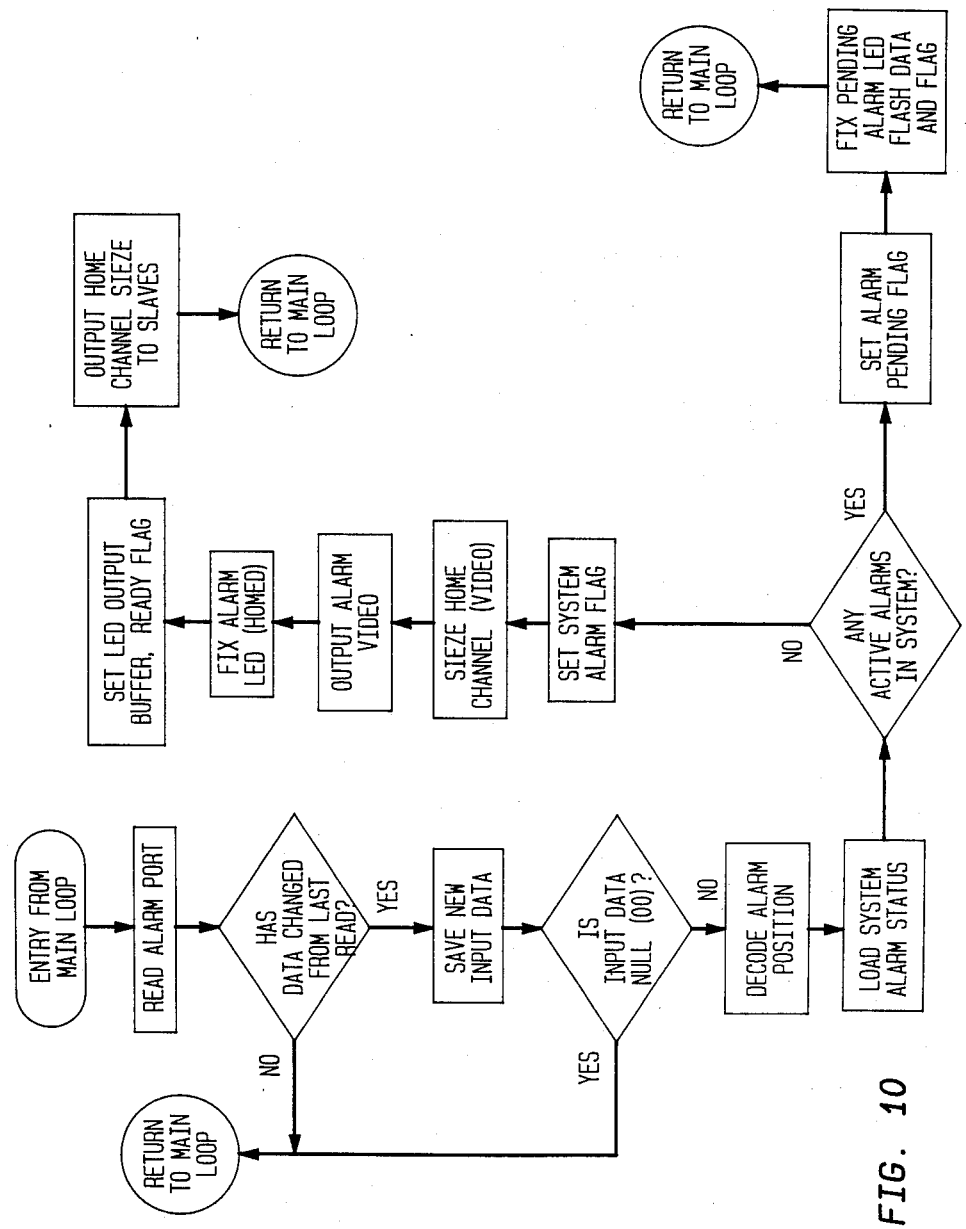

The alarm port service subroutine is further described in FIG. 10 and is used to detect which, if any, of the alarm ports has received a signal indicating that an alarm has been activated. This routine detects alarm signals in real time. It therefore dispenses with the need for a latch to hold the alarm signal. As a first step, the subroutine reads the alarm port to check any alarms. As shown in FIG. 3, the alarm port is a dedicated port for alarm inputs 145. It is then determined whether or not the alarm port data has changed since the last reading. If the data has not changed, that is if the same alarm port has been activated or if there is no new alarm port activated, control returns to the main loop.

If the data has changed, the new input data is stored and then checked to see if this new input data is a null input, that is, an input indicating that there is no alarm. If this is the condition, control is returned to the main loop since it is no longer necessary to service this routine any further. If not true, it means there is an alarm condition present that should be received. The subroutine then decodes the alarm position, determines which alarm has been activated and set up new locations in RAM that tell which alarm corresponds to which position are set up.

The system alarm status is then loaded from the appropriate memory locations into the accumulator and checked to see if there are any presently (new) active alarms anywhere in the system. If there are, an alarm pending flag is set and the pending alarm flag stored. The LED flash data is stored by setting the appropriate flag to cause an LED on the master unit to flash indicating an alarm is in the system. Control then returns to the main loop.

If there are no new alarms in the system, the system alarm flag is set indicating the status of the system alarms and the home monitor is seized to place the input channel corresponding to the position decoded in the earlier step on the monitor by turning on switch 35. The alarm LED which has been homed in on is also stored and placed in the LED output buffer. The ready flag may also set for use by the front panel display subroutine 250. Control is then returned to the main loop.

Figure 11:
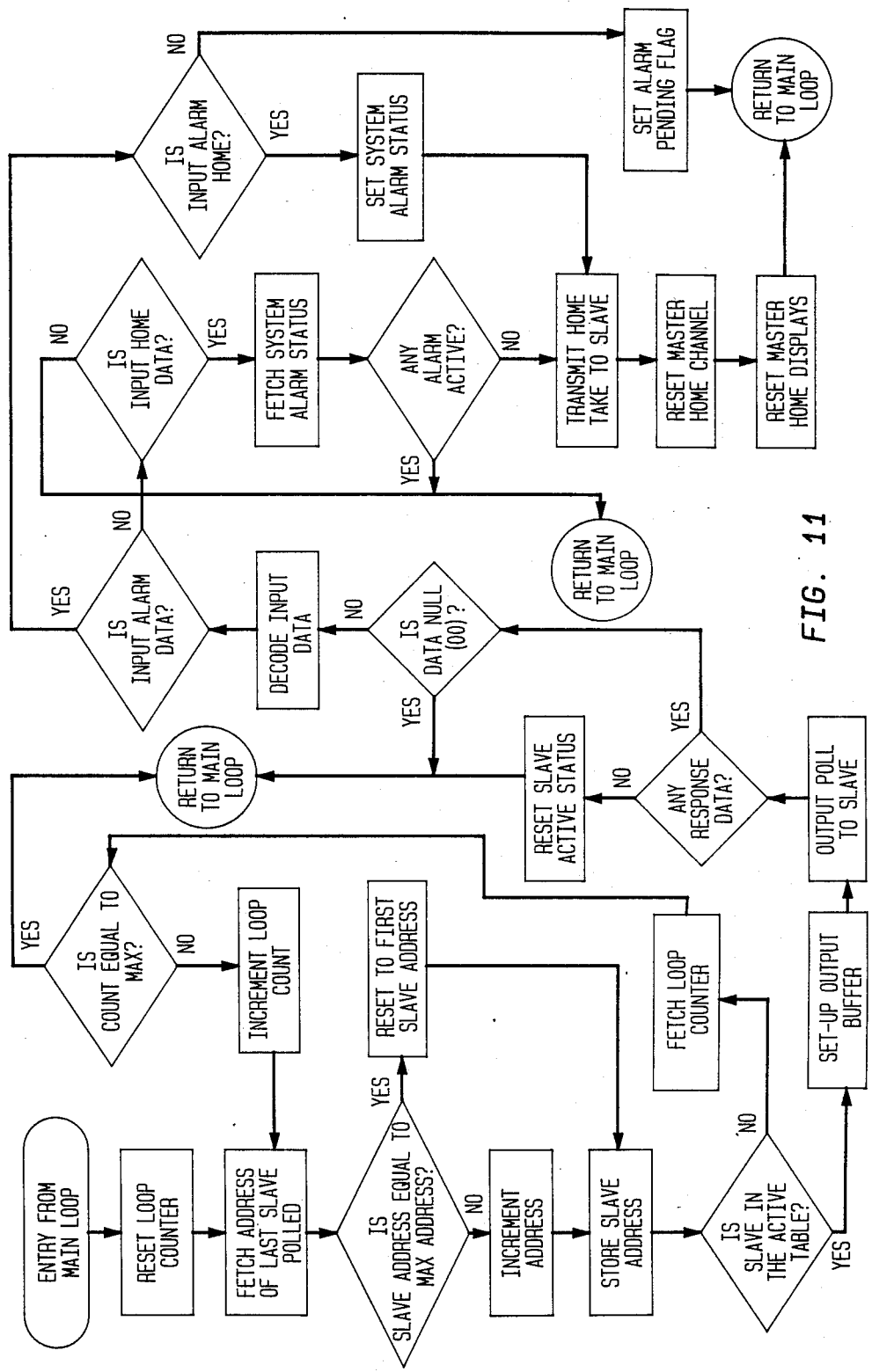

Upon returning to the main loop, the dwell clock service subroutine 300 is called and then the slave poll service subroutine which is more fully described below with respect to FIG. 11.

The slave poll service subroutine 310 is responsible for polling the slaves to check for their presence and their status.

A loop counter which keeps track of the number of times the slave poll service routine has been called is established. Upon entry from the main loop, the loop counter is reset to zero. This counter, as will be clear from the following explanation, is incremented each time the poll is made. If a predetermined number of polls are made and no response received, the program exits back to the main loop. Otherwise, it could remain trapped in this subroutine indefinitely.

Next the address of the last slave that was polled, which address has been previously stored in a buffer, is retrieved. It will then question if the slave address is equal to the maximum address. If it is, it will reset to the first slave address, store this slave address in the same buffer and then proceed with the subroutine. If it is not, the slave address is incremented again and the new address stored in the same buffer.

The subroutine next checks to see that the slave is in the active table. If it is not, it compares the number stored for the loop counter with the predetermined maximum count. If it is not, it will increment the loop count by one and once again return to the subroutine at the point where it fetches the address of the last slave polled. If the count is equal to the maximum, control is returned to the main loop.

If the slave is in the active table, an output buffer is set up, the information needed is stored to be sent to the slave in the buffer and the poll is output to the slave. The information to the slave includes a byte in which the least significant nibble carries the slave address and the most significant nibble contains data or a command. It will be clear to those skilled in the art, however, that the information carried in the most significant and least significant nibbles could be exchanged, requiring a simple alteration to the program.

The subroutine then questions whether there is any response data from the slave. If there is not, it will reset the slave active status indicating that it is no longer an active slave and return control to the main loop. The slave response includes an acknowledgment and status report of, for example, alarms, home status, or end of sequence status.

If there is a response, the subroutine determines whether or not null data is received from the slave. Null data, once again, corresponds to a condition of a logical zero for the data. If the logical data zero is returned in response to the poll, once again control is returned to the main progarm. If the data returned however is not logical zero, it will decode the input data, that is, it determines the locations of the slave providing the data and sets up new locations in RAM that tells which location corresponds to this information.

The program then tests whether or not the input is alarm data. If it is alarm data, it tests whether or not this input alarm is in home position. If it is not, it sets the alarm pending flag and returns to the main loop. This will, among other things, cause the alarm LED to flash. If, however, the alarm is homed, it will set the system alarm status and transmit the home position to be taken by the slave. It will then reset the master home channel and reset the master home display and return to the main loop.

If the input data is not alarm data, it will question whether the the input data is home data. If it is not, it will return to the main loop. If it is, it will then obtain the system alarm status and check to see if any alarm is active. If an alarm is active, it will once again return to the main loop for further servicing. If it is not, it will proceed to advise the slave that it now has control of the home monitors and can output the video information on it. The subroutine sets the master home channel, resets the master home displays and returns once again to the main loop. At this point the entire main loop is restarted at step 230.

Figure 12:
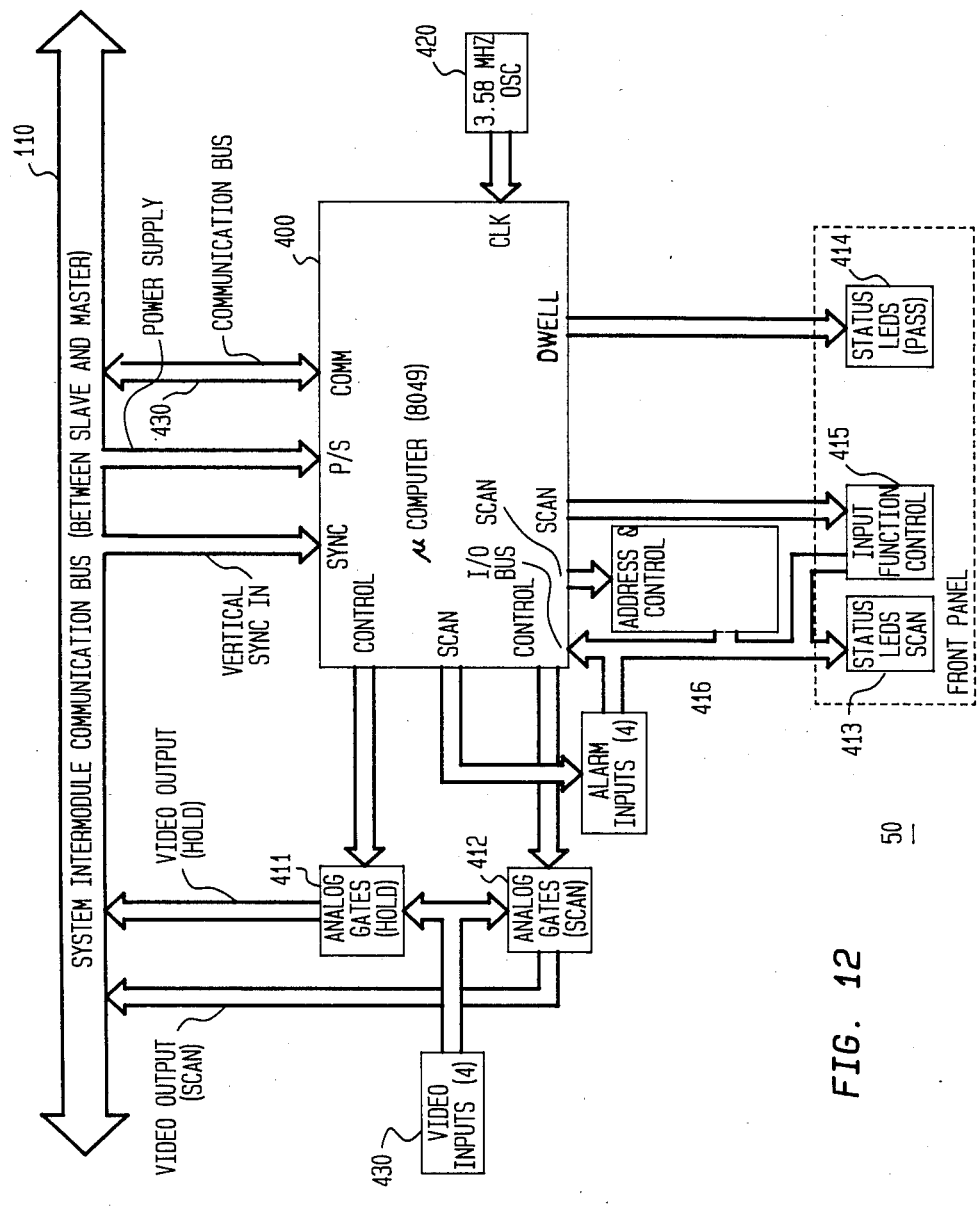
FIG. 12 is a block diagram of a microcomputer driven slave unit.

As previously described, with respect to FIGS. 1 and 2, in order to provide initial flexibility and unit cascadability, the system utilizes master units and slave units. Referring to FIG. 12, a block diagram of a microcomputer controlled slave unit is shown. The slave unit is similiar in structure to the master unit but does not include the SSIT, dwell circuit, power supply or video amplifiers.

Microprocessor 400 forms the heart of the slave unit and controls the video switching gates 411 and 412 as well as the front panel status LEDs 413 and 414 and the input function control switches 415. Also included are address and control circuitry 416, which operates identically to the master address and control circuit 155.

Microprocessor 400 is a complete microcomputer including onboard RAM and ROM such as for example, the 8049 integrated circuit manufactued by the Intel Corporation. Microcomputer 400 utilizes an external 3.58 megahertz oscillator 420 to provide the appropriate clock signals which are utilized by the microcomputer to sequence its instructions and control slave system timing. Microcomputer 400 will both send and receive instructions and signals over the system intermodule communication bus 110 to be able to communicate with the master unit via the communication bus 430.

The slave unit will receive a vertical input signal over bus 110, this signal having been received from the SSIT 140 as described with respect to FIG. 3. Video signals from the four video input channels associated with the slave unit, are input at terminals 430 where they are switched by analogue gates 411 and 412 which supply the video output signals to the hold and scan monitors respectively. These signals are placed upon the bus and routed to the appropriate monitor through the master unit as previously described.

Microcomputer 400 receives its power from the intermodule communication bus, the power supply being contained within the master unit as described previously. In order to perform the functions necessary, the slave unit will also need to be programmed with the specific set of instructions similar to those which are previously described with respect to the master unit, described hereinbelow and shown in FIGS. 13 through 18.

Figure 13:
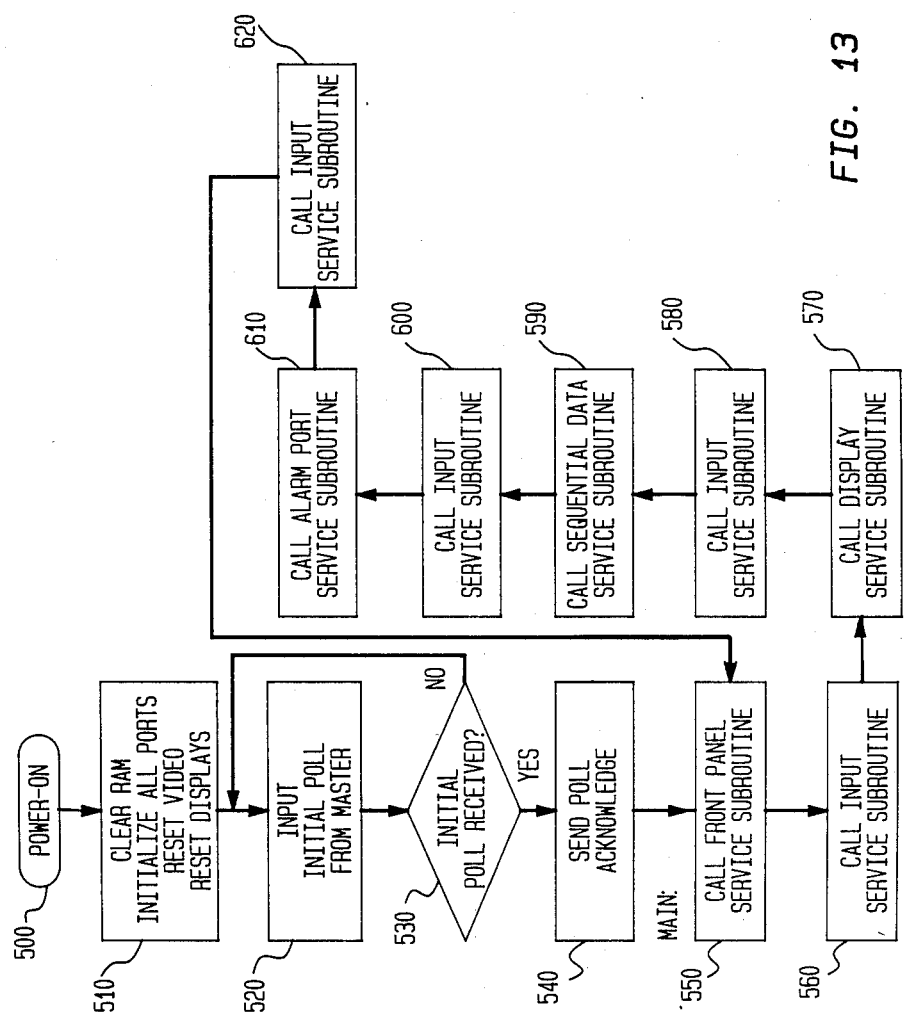
FIGS. 13 to 18 are flow charts explaining the operation of the slave unit.

Referring to FIG. 13, the main program is shown which consists of an initialization routine and then a number of sub routines which are called up by the main program in a specific order to form the main program loop After all the subroutines have been called up, control is returned back to the main loop of the slave unit program and the appropriate subroutines are once again called up in order. This permits continuing refreshing of the slave unit information to accomplish the appropriate switching and recognition of the alarm and front panel button status.

Referring to FIG. 13, upon power up 500 all RAM locations are cleared and all ports are set into the initial condition to await data. The video channels are reset and the displays are reset to the starting sequence position on both monitors, i.e. the signals applied from video switches 55 and 56. At step 520 the initial poll from the master is input as previously described in step 210 of the master unit program flowchart. If at the time the slave unit reaches this point and no poll has been received, the program will continue to loop through this step until a poll is received via step 530. When the poll is received at 540 it is acknowledged over a signal placed on communication bus 430 and ultimately received by the microprocessor 100 in master unit 30.

Figure 14:
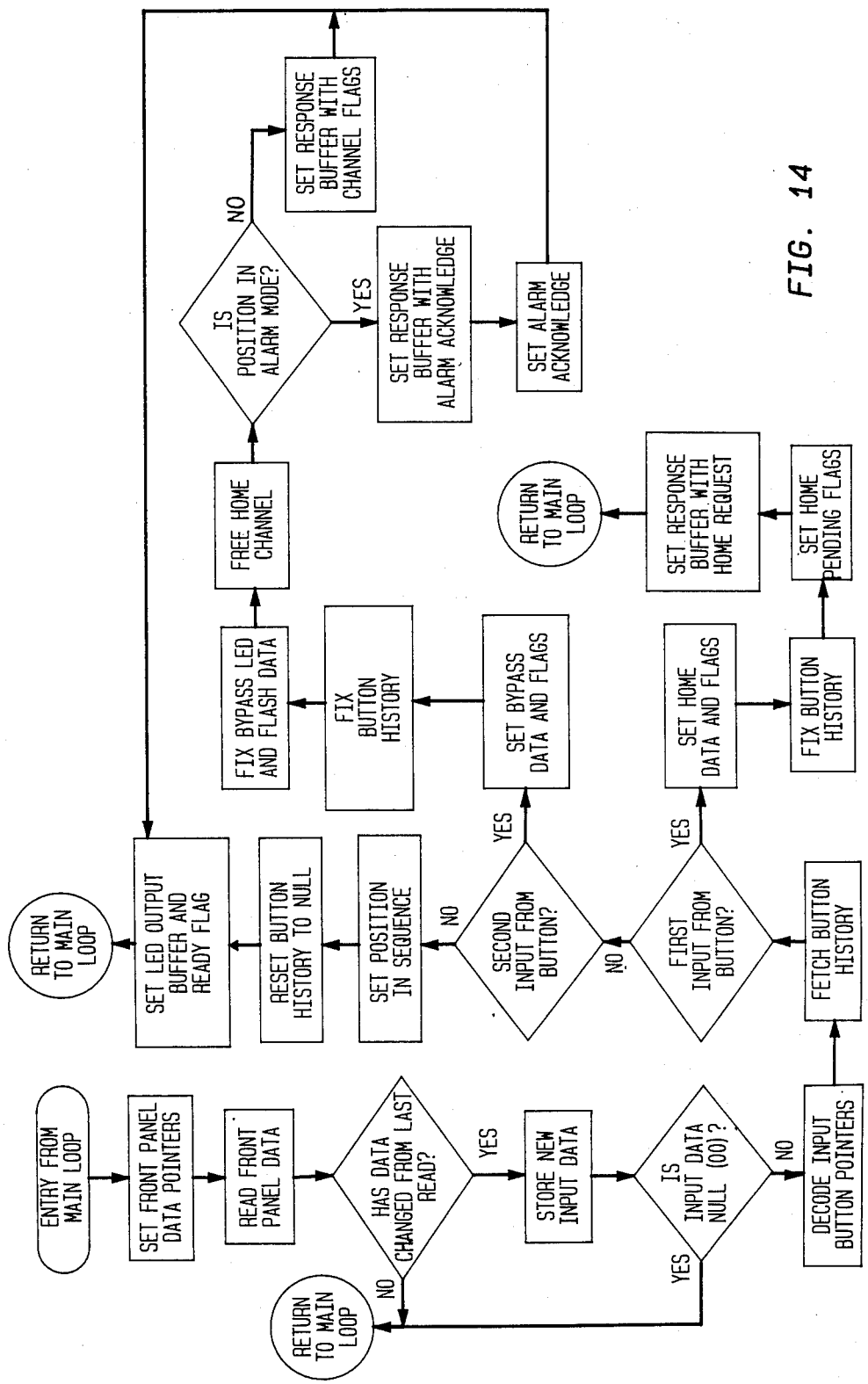
Figure 15:
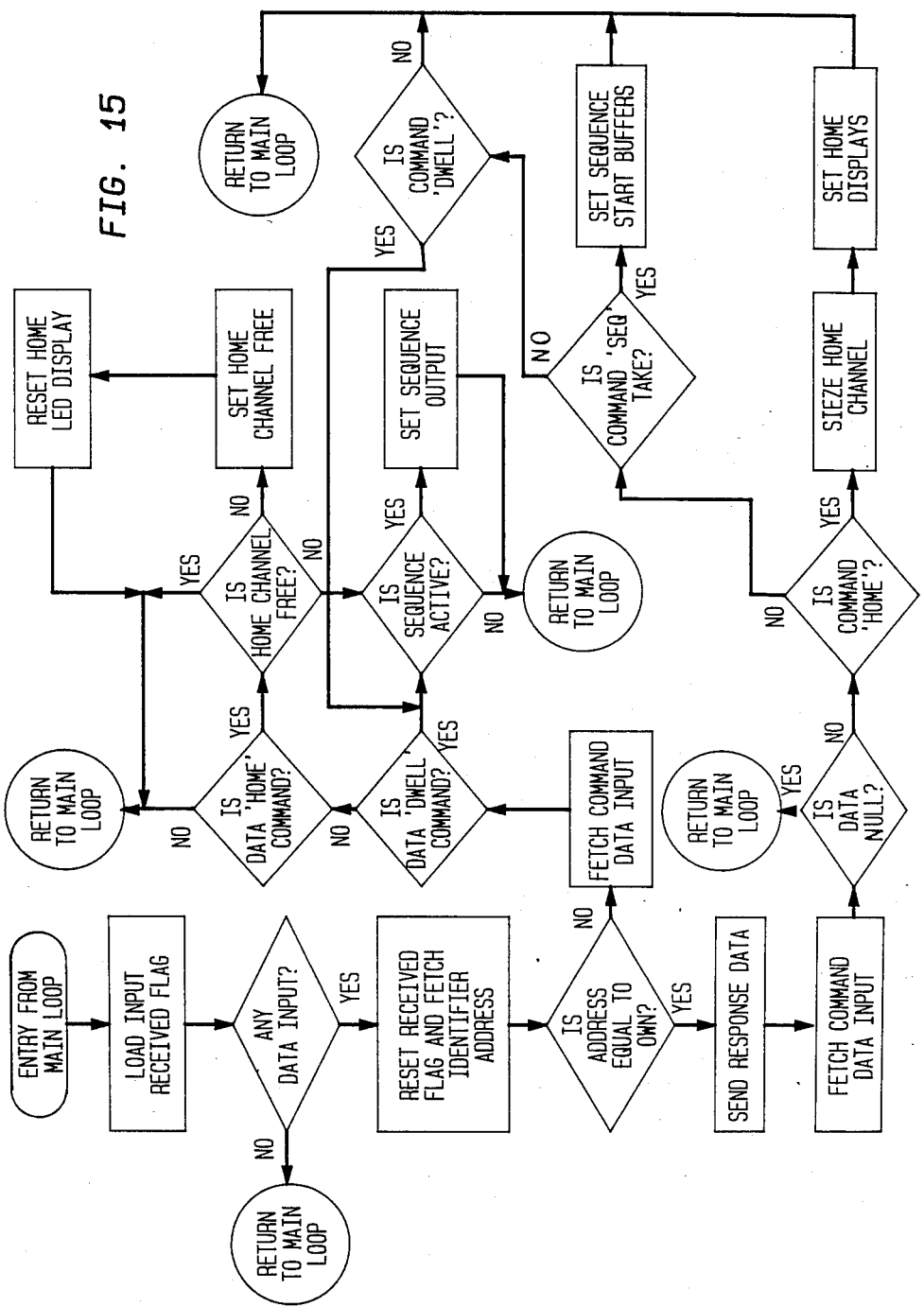
Figure 16:
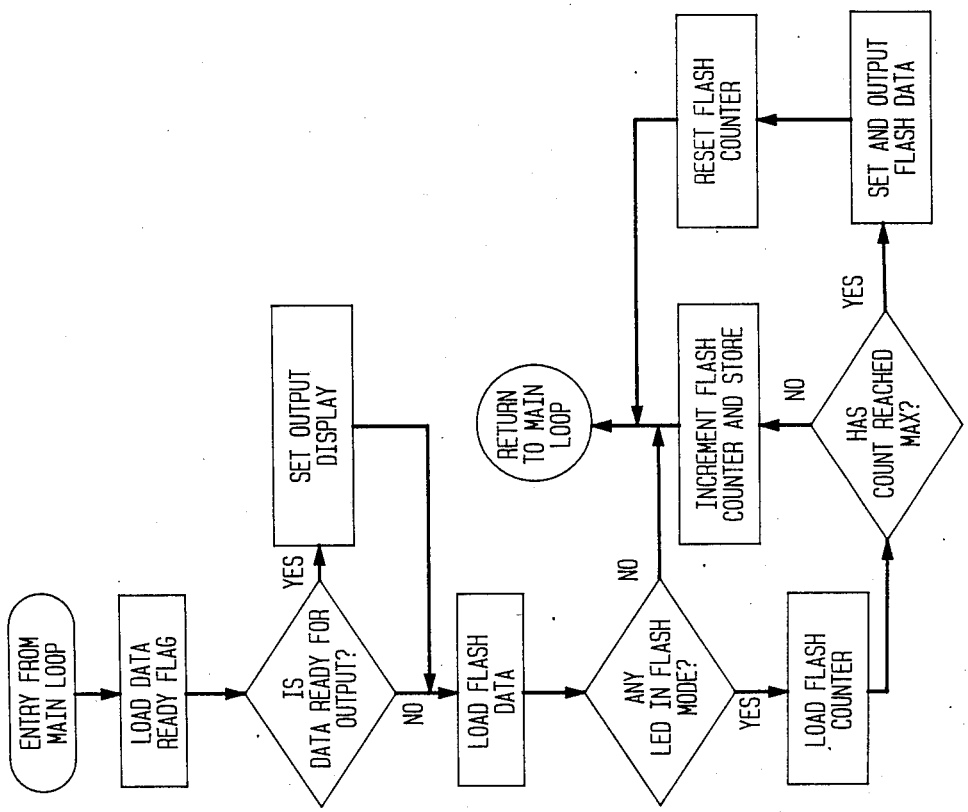
Figure 17:
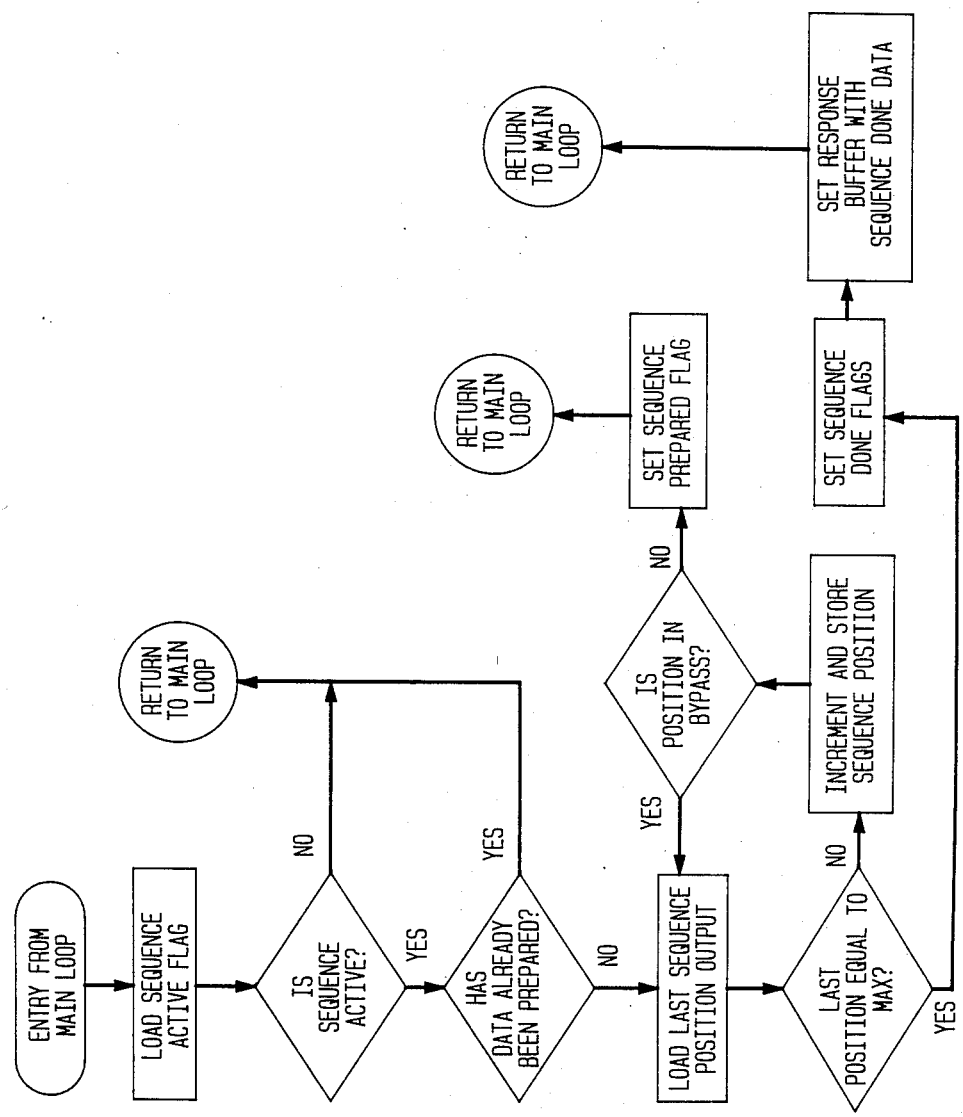

The main loop of the main slave unit program begins at step 550 by calling up the front panel service routine described in further detail in FIG. 14. The front panel service sub routine services the front panel buttons to determine what their status is in a manner similar to the front panel service button routine 230 used in the master unit. Upon entry from the main loop all front panel data pointers are set to select specific locations in RAM for the storage of data corresponding to the conditions of the front panel buttons. The front panel data is then read and it is then next determined whether or not the data that has been read has changed from its last reading. If it has not changed, there is no necessity to act further and the program returns to the main loop to move on to step 560. If the data has changed, however, new input data is stored and checked to see whether or not this is null data or in other words have zeros been returned. The zero condition will correspond to an open switch.

As described previously, the switches in the front panel are momentary contact push button switches one terminal which is connected to the scan line. The scan line scans each switch with a signal voltage equal to a logical one, thus enabling each switch in a predetermined order to provide a logical one when it is closed. In the open position, a logical zero is presented. that indicates that at that time the operator has made no change to the system to select a new video input. If, however, the input data is not null, the input button pointers are then decoded to determine which button has been depressed. The subroutine then assigns another set of RAM buffers to set up new locations in RAM to determine which button corresponds to the new information. The button history is then obtained to determine whether or not this is the first input from the button. If it is the first depression of the button, as described previously with respect to the master unit, it means that the operator wishes to view that particular video input on the hold monitor.

If this is the case, this information is stored by the microcomputer, by setting the home data and flags and a new button history is stored corresponding to the latest input.

The home pending flags are then set to indicate that there is a new home request waiting and this request is set in the response buffer. This must be done since a slave can not take direct control of the home monitor channel. Instead the master must note the request, free the home channel and then turn it over to the slave. At this point, the program will return control to the main loop of the program to re-enter and call up the next subroutine at step 570.

If, however, this was not the first input from the button, that is, if it is the second input from the button, this corresponds to the condition where the operator wishes to bypass a particular video input or camera in the sequential scanning. Thus, the microprocessor will then set the bypass data and flags indicating in the appropriate memory location that this particular video input is to be skipped in the sequential operation. This information is then stored in the button history location of the RAM, and then further stored in association with the appropriate bypass LED so that it will be flashed. The home monitor is then freed or, in other words, made available for other purposes.

In the next step, the front panel button service will ask whether or not the position is in the alarm mode. If it is not, it will reset the response buffer with the channel flags on the appropriate LED output buffer which will in turn drive the front panel LED and then return to the main loop program. If, however, the position is in the alarm mode, it will set the response buffer with an alarm acknowledge and then once again set the LED output buffer and ready flag and return to the main loop program.

If it, on the other hand, was determined, however, that this was not the second input from the button, but instead was the third input, it would mean that the system is to return to continuing to run an identical sequential scan on both monitors. It will then take this other position, place it back into the sequence location of the memory, reset the button history to null and then set the LED output and ready flag to drive the appropriate LEDs and return to the main loop program. Since the information will be reset into the sequence data, it will once again be able to be scanned sequentially.

The next step called up by the main program is the input service subroutine which among other functions provides the timing information that is determined in the dwell clock service subroutine of the master program. The slave units do not include the circuitry for controlling the dwell and therefore in order to obtain the dwell information to determine how long a camera for a given scene should be on, it is necessary to refer back to the information provided in the main or master program. To do this, the input service subroutine is called up. Other information such as home, dwell time release and command data are also serviced by this routine.

Upon entry into the input service subroutine, the input received flag will be loaded into the accumulator. If data has not been input, in other words a flag has not been set, control is returned to the main loop.

If a flag has been set the received flag is reset to zero so that the program will be able to receive the next input data. The address of the slave providing the flag is set. The program then determines if the address is equal to the address of the slave running this program. If it is not, the type of command held in the data is obtained and it is then determined whether or not the command is a dwell command. This is because dwell commands are placed on the line without any particular slave address. If it is not a dwell command, it will then check to see if it is a home command and if it is not a home command, it will return to the main loop. If it is a home command, that is to establish a new home channel, it will determine whether or not the home channel is free. If it is free, it will return to the main loop. If however it has previously been freed up, the subprogram sets or store the home channel as free, reset the home LED display and then returns to the main loop.

If the data is, however, a dwell command, the program next must determine whether or not the sequence for that slave is active. If it is not it returns immediately to the main loop. If, however, the slave is active the sequential ouput buffer and then returns to the main loop. This will then be used by the master to transfer control to the slave fo the sequential channel scanning.

If the slave address, for the input data however is equal to the address of the slave running this subroutine, it will send response data (current status) and then obtain what type of command it is on the serial I/O bus. If the data is null, that is, if a zero is returned, program control is returned to the main loop. If the command data is not null, it will then check to see if the command is a home command. If it is, it will seize the home channel and set the home display and return to the main loop. If it is not a home command, it will determine whether or not the command sequence is an instruction to take control of the sequence. If it is, it will set the sequence start buffers and return to the main loop. If it is not, it will determine whether or not it is a dwell command. If it is not a dwell command, it will once again return to the main loop. If it is a dwell command, it will determine if the sequence is active as previously described.

The display service sub routine 570 is next called up. This sub routine services the LEDs to cause appropriate ones to flash depending upon the condition of the system, and works in a manner similiar to master subroutine 250.

As a first step, after entry from the loop the data ready flag is loaded into the accumulator and then it is queried whether or not the data is ready for output. If it is, the output display is stored and as a next step the flash data is loaded from the front panel button service subroutine 550 and alarm port service subroutine 610. If the data is not ready for output, the flash data is immediately loaded and it will then check to see if any LED is in the flash mode. If there are no LEDs in the flash mode, it returns to the main loop. If there are LEDs in the flash mode, the flash counter is loaded and it is determined if the flash counter has reached a maximum. If it is not, the counter is incremented by one, in the incremented value stored and control returns to the main loop. If the count has reached maximum, however, the flash data is stored and output. The flash counter is reset to zero and the program returns to the main loop.

The main loop then calls up the input service subroutine again at step 580 in order to once again establish the dwell, home, or other conditions. Thereafter, the main program calls up the sequential data service at step 590, which is further described with respect to FIG. 17.

This subroutine serves to switch the input channels in sequence.

In the first step of the sequential data service subroutine 590 after entry from the main loop, the sequence active flag is loaded, which flag depending upon its value determines whether or not the sequencing action is operating. If the sequence flag indicates that it is not active, then the program control is returned to the main program. If, however, the sequence is active, it determines if the data has already been prepared by checking the condition of the prep flag. The prep flag is set later on in this subroutine. If the data has already been prepared, the program control is returned to the main loop. If it has been found that the flag has already been set there is no need to execute this program. The program can run 10, 20 or more times before the dwell period has expired depending on the front panel setting. By exiting at this point unneccessary execution of this subroutine is avoided.

If the data has not been prepared, then the subroutine must at this time prepare it and it will load the last sequential output position into the appropriate buffer. The program then asks if the last position is equal to the maximum position for the sequences. If it is, it will set the sequence done flag or in other words, a flag indicating that that sequence has been completed. The buffer is then also set with the sequence done data and is returned to the main loop where the sequence, upon return to the program, can be re-continued. If, however, the sequential position is not equal to the maximum sequential position, this position is incremented and stored in the sequence position location of memory.

In the next step, it is determined whether or not this position is bypassed. If it is not to be bypassed, it will set the flag indicating that the sequence has been prepared and return to the main loop. If it is, however, to be bypassed, it will load the last sequence position in the output buffer and test to see if the last position is equal to maximum. If it is not, it will be incremented until a position not in the bypass mode is determined.

In the next step, at 600, the input service subroutine is called up once again after which the alarm port service subroutine is called.

Figure 18:
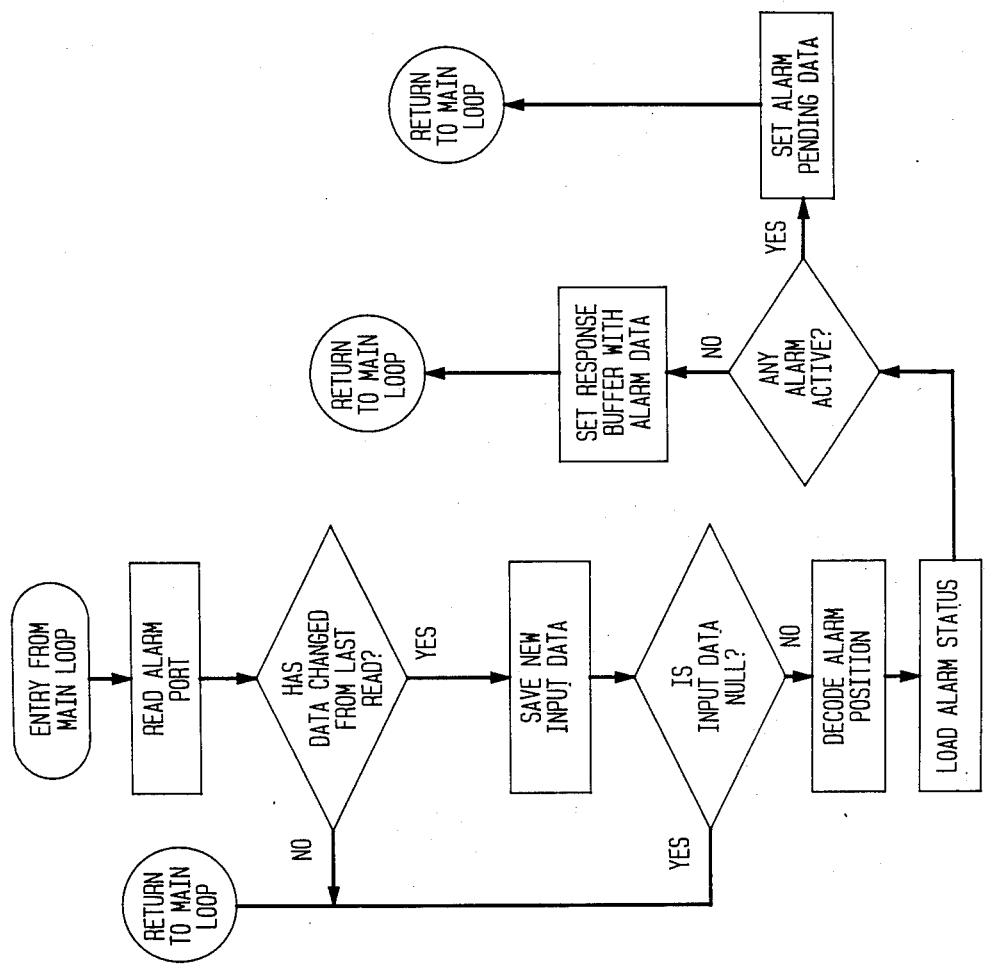

FIG. 18 shows a flowchart describing the alarm port service subroutine 610. After entry into the main loop into the alarm port service subroutine, the alarm port is read. If data has not changed from the last time it was read, the program controls merely return to the main loop. If, however, it has changed, it will save the new input data in the appropriate memory location and then test whether or not a zero has been returned. If a zero has been returned, it indicates that there is no alarm and control is returned to the main loop. If, however, the data is not null, it indicates that there is an alarm presently in the system and it will load the alarm status. If the alarm is now presently active, that is if a new alarm is now being received, it will set the alarm pending data flag and return to the main loop. If the alarm is not presently active, it will set the response buffer with the alarm data and then return control to the main loop.

Once back in the main loop, the program control returns to step 550 where the sequence of steps in the program can be continued.

The various camera control functions, for example, pan, tilt, zoom, focus or iris controls, may also be added to the system as modules. Prior art control systems required separate controls for each control function and each camera. The present invention requires only single modules containing the specific control functions, for example, a focus control or pan and tilt control, and separate switches corresponding to each camera.

Figure 19:
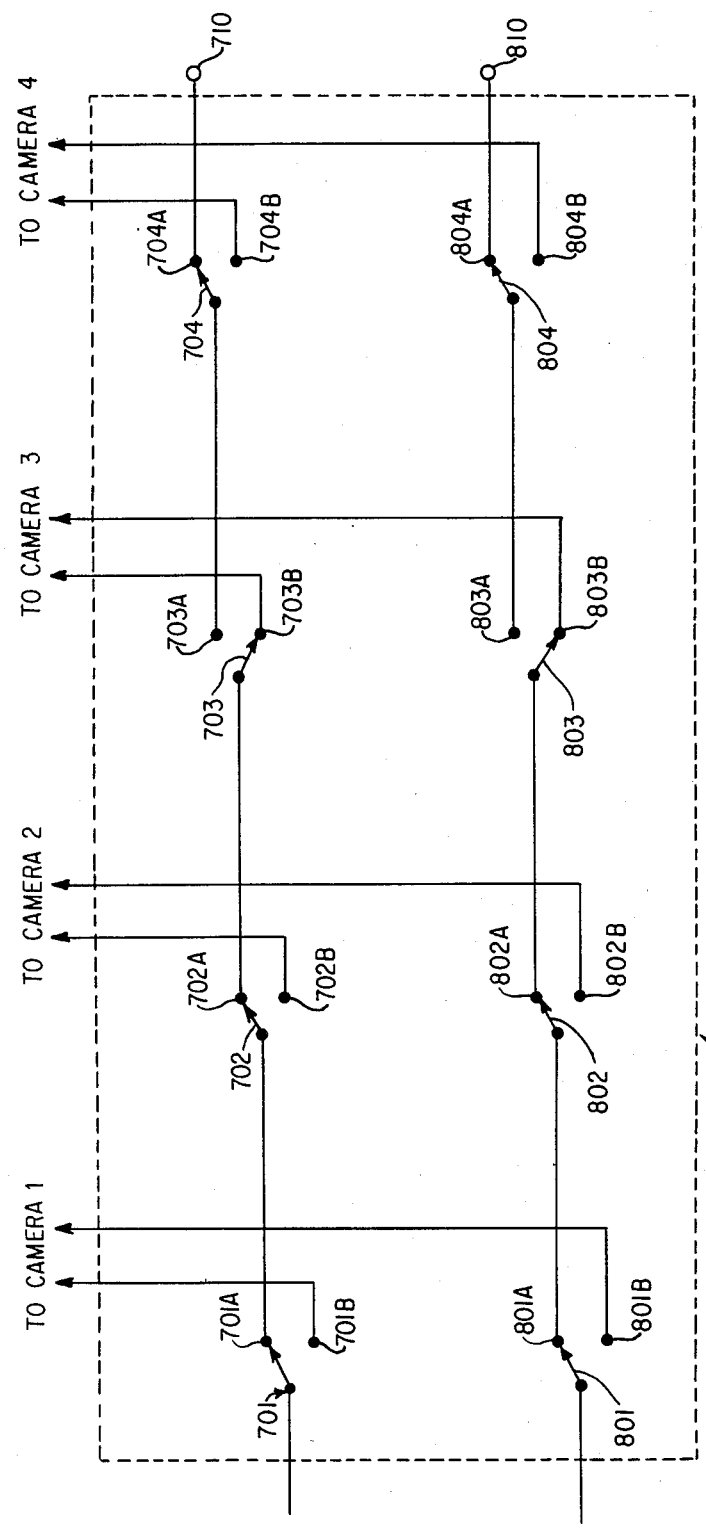
FIG. 19 is a schematic diagram of a video control switch module according to the present invention.

Refer to FIG. 19 in which a four camera switcher module 1000 is shown schematically for switching control signals received at terminals 700 and 800 respectively. These signals may be, for example, tilt and zoom controls respectively.

Module 1000 includes switches 701, 702, 703, and 704 and switches 801, 802, 803, and 804. These are conventional single pole double throw switches (SPDT) push-button switches that remain in position when pressed and are released when pressed a second time. The switches are mechanically ganged, for example, when switch 701 is depressed switch 801 is also depressed.

When switch 701 through 704 or 801 through 804 are depressed the switch arms are in position to couple the input terminals 701C, 702C, 703C, 801C, 801C, and 804C to switch contacts 701B, 702B, 703B, 704B, 801B, 802B, 803B, and 804B respectively. When the switches are in the released or non-depressed conditions the switch arms couple the "C" terminals to the "A" contacts 701A, 702A, 703A, 801A, 802A, 803A, and 804A.

In operation if the operator wishes to tilt camera 3, redepresses switch 704 and the adjusts the tilt control. If he wishes to then adjust camera 4, he must release switch 703 and press switch 704.

Contact 701A is coupled to terminal 702C, and contact 701B is coupled to the camera being controlled. The remaining switches are coupled in a similiar fashion in series with one another. This switching arrangement essentially sets up a system bus which enters each module at terminals 700 and 800 and exits at terminals 710 and 810 respectivley. Further, due to the coupling arrangement described above and shown in FIG. 19, no more than one switch can ever send signals over the bus at anytime. Even if the operator forgets to release a switch only one camera would be connected to the control signal present at terminals 700 and 800.

The switches have a priority system in which the lower numbered camera will always take priority over higher numbered camera. Thus if the operator had last depressed the switch for camera number 2, (switch 702) and then depressed the switch for camera number 3, (switch 703) without releasing switch 702, the depression of switch 703 would have no effect. Only camera 2 would receive the control signal.

Modularity is achieved since the output at one control switch module 1000 may be connected to the input terminals (700,800) of another module 1000. This switching system is compatible with the modular concept of the present invention since it permits an electric interlocking of controls. In prior art systems, mechanical interlocks were used, which however, cannot easily be used with individual, cascaded modules. Furthermore, the switch system is entirely passive and requires no external power supply.

What is claimed is:

1. For use in a closed circuit television system for selectively coupling at least one of N video sources to one or more video output devices, the improvement comprising:
a chassis adapted to receive a plurality of physically separate plug-in modules,
at least two switching modules plugged into said chassis, each switching module including M input terminals, each of which receives video signals from one of said N video sources, where M is less than N, the total number of switching modules providing between them a total of at least N input terminals so that any of said N video sources may be coupled to said one or more video output devices, at least one of said switching modules including at least one output terminal for coupling said N video sources to said one or more video output devices,
means for scanning at least some of said N video sources in a predetermined sequence, and
means responsive to said scanning means for coupling the video signals from said N video sources sequentially to said at least one output device.

2. The improvement according to claim 1, wherein said means for coupling includes switching means at each of said switching modules for connecting selected ones of said N video sources to said scanning means and holding switch means for coupling any selected one of such video sources to said one or more video output devices.

3. The improvement according to claim 1, wherein said N video sources comprises video cameras and wherein there is further provided a pan and tilt module plugged into said chassis for causing any selected one of said video cameras to be moved with respect to pan and tilt axes.

4. The improvement according to claim 1, wherein said video sources comprise video cameras and wherein there is further provided a lens control module plugged into said chassis, said lens control module including a manually adjustable member for focusing and/or zooming the lens of a selected video camera.

5. The improvement according to claim 1, wherein said at least one switching module includes master control circuit and the other switching modules include slave circuitry, the switching functions of said other modules, being controlled by said at least one switching module.

6. The improvement according to claim 1, wherein there is further provided a pan and tilt module plugged into said chassis for causing and selected one of said video cameras to be moved with respect to pan and tilt axes.

7. The improvement according to claim 6, wherein there is further provided a lens control module plugged into said chassis, said lens control module include a manually adjustable member for focusing and/or zooming the lens of a selected video camera.

8. The improvement according to claim 1, wherein there is further provided a lens control module plugged into said chassis, said lens control modules including a manually adjustable member for focusing and/or zooming the lens of a selected video camera.

9. The improvement according to claim 1, wherein said at least one switching module includes master control circuitry and the other switching moduels include slave circuitry, the switching functions of said other modules being controlled by said at least one switching module.

10. The improvement according to claim 1, wherein said at least one switching module includes master control circuit and the other switching modules include slave circuitry, the switching functions of said other modules being controlled by said at least one switching module.

11. For use in a television surveillance system for selectively coupling one of N video cameras to one or more video monitors and for controlling the position of said cameras and the movement of the cameras lens, the improvement comprising:
- a chassis adapted to receive a plurality of physically separate plug-in modules,
- at least two switching modules plugged into said chassis, each of said switching moddules including M input terminals, each of which receives video signals from one of said cameras, where M is less than N, the total number of switching modules providing between them a total of at least N input terminals so that any of said N video cameras may be coupled to said one or more video output devices, and M switch means connected to respective ones of said input terminals, at least one of said switching modules including at least one output terminal for coupling said video cameras to said one or more video monitors,
- means for scanning said N video cameras in a predetermined sequence and coupling their video signals sequentially to at least one of said video monitors, each of said M switch means selectively connecting the video camera connected to its associated terminal to said scanning means or to said one or more video monitors, and
- at least one control module for controlling the position and lens movement of selected ones of said video cameras.

* * * * *